(12) United States Patent
Sterbentz et al.

(10) Patent No.: US 10,559,389 B2
(45) Date of Patent: Feb. 11, 2020

(54) MODULAR NUCLEAR REACTORS INCLUDING FUEL ELEMENTS AND HEAT PIPES EXTENDING THROUGH GRID PLATES, AND METHODS OF FORMING THE MODULAR NUCLEAR REACTORS

(71) Applicant: BATTELLE ENERGY ALLIANCE, LLC, Idaho Falls, ID (US)

(72) Inventors: James Sterbentz, Idaho Falls, ID (US); James E. Werner, Idaho Falls, ID (US)

(73) Assignee: Battell Energy Alliance, LLC, Idaho Falls, ID (US)

( * ) Notice: Subject to any disclaimer, the term of this patent is extended or adjusted under 35 U.S.C. 154(b) by 316 days.

(21) Appl. No.: 15/425,414

(22) Filed: Feb. 6, 2017

(65) Prior Publication Data

US 2018/0226159 A1   Aug. 9, 2018

(51) Int. Cl.
G21C 3/16 (2006.01)
G21C 3/62 (2006.01)
G21C 15/257 (2006.01)

(52) U.S. Cl.
CPC ............... *G21C 3/16* (2013.01); *G21C 3/623* (2013.01); *G21C 15/257* (2013.01)

(58) Field of Classification Search
CPC ........ G21C 15/257; G21C 3/16; G21C 3/326; G21C 3/623; G21C 3/626; G21C 15/06
USPC ................................................. 376/367, 424
See application file for complete search history.

(56) References Cited

U.S. PATENT DOCUMENTS

| 948,835 A | 2/1910 | Walter |
|---|---|---|
| 1,335,506 A | 3/1920 | Jones |
| 1,454,053 A | 5/1923 | Jones |
| 1,522,866 A | 1/1925 | Colston |
| 1,524,595 A | 1/1925 | Sward |
| 1,525,094 A | 2/1925 | Jones |
| 1,782,409 A | 11/1930 | Chute |
| 1,790,151 A | 1/1931 | How |
| 1,798,354 A | 3/1931 | Ris |

(Continued)

FOREIGN PATENT DOCUMENTS

| CN | 104766636 A | 7/2015 |
|---|---|---|
| WO | 2014176069 A2 | 10/2014 |

OTHER PUBLICATIONS

McClure et al., "Design of Megawatt Power Level Heat Pipe Reactors", Los Alamos National Laboratory, LA-UR-15-28840, Nov. 2015, 41 pages.

(Continued)

*Primary Examiner* — Jack W Keith
*Assistant Examiner* — Daniel Wasil
(74) *Attorney, Agent, or Firm* — TraskBritt

(57) ABSTRACT

A modular nuclear reactor comprises a plurality of sections arranged in a pattern and a side reflector material surrounding the plurality of sections. Each section includes a tank comprising a front plate, a back plate, side plates, a top plate, and a bottom plate. A plurality of grid plates are located within the tank. Each grid plate comprises a plurality of apertures and is vertically separated from an adjacent grid plate. The tank further includes a plurality of fuel elements extending through each grid plate. A plurality of heat pipes extend through each grid plate, the top plate, and an upper reflector. Methods of forming the modular nuclear reactor are also disclosed.

16 Claims, 15 Drawing Sheets

(56) References Cited

U.S. PATENT DOCUMENTS

| | | | |
|---|---|---|---|
| 1,853,236 A | 4/1932 | Shadle | |
| 2,384,714 A | 9/1945 | Villiger | |
| 2,591,658 A | 4/1952 | Haringhuizen | |
| 2,693,942 A | 11/1954 | Guala | |
| 2,774,575 A | 12/1956 | Hellmuth | |
| 2,937,079 A | 5/1960 | Pool | |
| 3,378,449 A * | 4/1968 | Roberts | G21D 5/02 376/367 |
| 3,400,758 A | 9/1968 | Suk | |
| 3,630,276 A | 12/1971 | Kikin et al. | |
| 3,848,430 A | 11/1974 | Porter et al. | |
| 3,935,063 A * | 1/1976 | Dunckel | G21C 15/18 376/367 |
| 3,960,655 A | 6/1976 | Bohanan et al. | |
| 3,961,665 A | 6/1976 | Langbroek et al. | |
| 4,163,690 A | 8/1979 | Jabsen | |
| 4,343,349 A | 8/1982 | Busch, Jr. | |
| 4,360,059 A | 11/1982 | Funke | |
| 4,506,183 A | 3/1985 | Morris | |
| 4,842,053 A | 6/1989 | Yatsuhashi et al. | |
| 4,886,111 A | 12/1989 | Nakai et al. | |
| 4,909,316 A | 3/1990 | Kamei et al. | |
| 5,195,575 A | 3/1993 | Wylie | |
| 5,217,066 A | 6/1993 | Killebrew | |
| 5,247,548 A | 9/1993 | Malloy et al. | |
| 5,408,510 A | 4/1995 | Ball et al. | |
| 5,915,465 A | 6/1999 | Fix et al. | |
| 6,513,583 B1 | 2/2003 | Hughes | |
| 6,718,001 B2 | 4/2004 | Hidaka et al. | |
| 6,719,041 B2 | 4/2004 | Docter et al. | |
| 6,827,138 B1 | 12/2004 | Master et al. | |
| 8,300,759 B2 | 10/2012 | Jeong et al. | |
| 9,111,651 B2 | 8/2015 | Bae et al. | |
| 9,536,629 B2 | 1/2017 | Dederer et al. | |
| 2011/0094720 A1 | 4/2011 | Wang et al. | |
| 2015/0228363 A1 | 8/2015 | Dewan et al. | |
| 2016/0027536 A1 | 1/2016 | Mcclure et al. | |
| 2016/0329113 A1 | 11/2016 | El-Genk | |
| 2017/0249999 A1 | 8/2017 | Dewitte et al. | |
| 2018/0075931 A1 | 3/2018 | Arafat et al. | |
| 2018/0268950 A1 | 9/2018 | McKellar | |

OTHER PUBLICATIONS

International Written Opinion from International Application No. PCT/US2017/015466, dated Jul. 19, 2018, 5 pages.

International Search Report from International Application No. PCT/US2017/015466, dated Jul. 19, 2018, 2 pages.

Rosenthal, "An Account of Oak Ridge National Laboratory's Thirteen Nuclear Reactors", Oak Ridge National Laboratory, ORNL/TM-2009/181, (Aug. 2009) 75 pages.

Demuth, "SP100 Space Reactor Design", Progress in Nuclear Energy, vol. 42, No. 3, (2003) pp. 323-359.

* cited by examiner

MODULAR NUCLEAR REACTORS INCLUDING FUEL ELEMENTS AND HEAT PIPES EXTENDING THROUGH GRID PLATES, AND METHODS OF FORMING THE MODULAR NUCLEAR REACTORS

STATEMENT REGARDING FEDERALLY SPONSORED RESEARCH OR DEVELOPMENT

This invention was made with government support under Contract Number DE-AC07-05-ID14517 awarded by the United States Department of Energy. The government has certain rights in the invention.

FIELD

Embodiments of the disclosure relate generally to structures comprising fuel elements integral with heat pipes, to modular nuclear reactors, and methods of forming such modular nuclear reactors and structures. More particularly, embodiments of the disclosure relate to modular nuclear reactors including a plurality of the structures, modular nuclear reactors comprising a plurality of reactor sections, and related methods of forming the modular nuclear reactors with preassembled components.

BACKGROUND

Power production in areas remote from conventional power sources is often desired. In addition, mobile power production is often desired during power outages, natural disasters, or in areas that are remote from conventional power and fuel sources. One option of mobile power production includes diesel-powered or gas-powered electricity generators. However, transportation of fuels for such generators may be unduly burdensome and costly when the generators are located at substantial distances from heavily traveled areas or at times immediately following a natural disaster when normal transportation routes are compromised.

One alternative to such diesel-powered or gas-powered generators includes nuclear reactors. Mobile nuclear reactors may include a monolithic reactor core or may suffer from one or more design flaws. For example, some mobile nuclear reactors comprise a monolithic reactor core that serves as cladding for fuel elements and heat pipe evaporator sections of the reactor core. However, the monolithic reactor core requires a plurality of holes formed therein to house fuel elements of the reactor core. FIG. 1A is a simplified plan view of a portion of a reactor core 100 including a monolithic structure 102. The monolithic structure 102 may be defined by a webbed structure defining a plurality of holes therein for housing fuel elements 104 and heat, pipes 106. The monolithic structure 102 may have a length greater than about 100 cm (such as about 150 cm). Due to the length of the holes and the shape of the monolithic structure, the holes are difficult to fabricate (e.g., machine).

FIG. 1B and FIG. 1C are simplified plan views of the reactor core 100 illustrating a fuel element 104 and a heat pipe 106, respectively. The fuel element 104 and the heat pipe 106 may be substantially surrounded by the monolithic structure 102. For example, the heat pipe 106 may include a heat transfer fluid directly filling and in contact with the monolithic structure 102. In other words, the heat pipe 106 may not include a pipe wall and the heat transfer fluid may be contained within the holes of the monolithic structure 102. Portions of the monolithic structure 102 between the fuel element 104 and the heat pipe 106 and between adjacent fuel elements 104 may exhibit a relatively thin wall. For example, referring to FIG. 1B, a distance $D_1$ between the fuel elements 104 and the heat pipes 106 may be as small as about 1.0 mm and a distance $D_2$ between adjacent fuel elements 104 may be as small as about 1.75 mm. During use and operation, the thin area may be susceptible to deformation and breaking. For example, at the operating temperatures of the reactor core, the material of the monolithic structure 102 may be susceptible to deformation or breaking.

In addition, the heat pipes 106 may be welded to an upper reflector at a boundary between the heat pipes 106 and the upper reflector. However, welding each heat pipe 106 of the reactor core may require welding hundreds to thousands of heat pipes 106 to form a seal between the heat pipes 106 and the upper reflector. A failed weld between a single heat pipe 106 and the upper reflector may result in a leak between the reactor core and the external environment, compromising the safety of the nuclear reactor.

BRIEF SUMMARY

Embodiments disclosed herein include structures including a heat pipe integral with a fuel element, modular nuclear reactors, and related methods. For example, in accordance with one embodiment, a modular nuclear reactor comprises a central portion comprising a plurality of structures. Each structure comprises a fuel material surrounded by an outer cladding material, the fuel material defining an annular space at a center portion of the fuel material, a heat pipe disposed in the annular space, and an inner cladding between the fuel material and the heat pipe. The modular nuclear reactor further comprises a side reflector disposed around the central portion.

In additional embodiments, a modular nuclear reactor comprises a plurality of sections, each section comprising an inner tank comprising a front plate, a back plate, side plate, a top plate, and a bottom plate, a plurality of grid plates, each grid plate of the plurality of grid plates comprising a plurality of apertures and vertically separated from an adjacent grid plate, a plurality of fuel elements extending through each grid plate of the plurality of grid plates, and a plurality of heat pipes extending through each grid plate of the plurality of grid plates, the top plate, and an upper reflector. The modular nuclear reactor further comprises a side reflector material surrounding the plurality of sections.

In further embodiments, a method of forming a modular nuclear reactor comprises assembling one or more fuel element structures on a grid plate, each fuel element structure comprising a fuel material surrounded by an outer cladding material, the fuel material defining an annular space at a center portion of the fuel material, a heat pipe disposed in the annular space, and an inner cladding between the fuel material and the heat pipe. The method further comprises disposing an upper reflector over the one or more fuel element structures.

In yet additional embodiments, a method of forming a modular nuclear reactor comprises assembling one or more prefabricated fuel elements on a bottom plate of an inner tank and through apertures in a plurality of grid plates, assembling one or more prefabricated heat pipes on the bottom plate of the inner tank and through the apertures in the plurality of grid plates, forming a seal between the one or more prefabricated heat pipes and a top plate of the inner tank, forming an outer tank substantially surrounding the inner tank, and filling the inner tank with a heat transfer fluid.

DETAILED DESCRIPTION

Figure 1A:
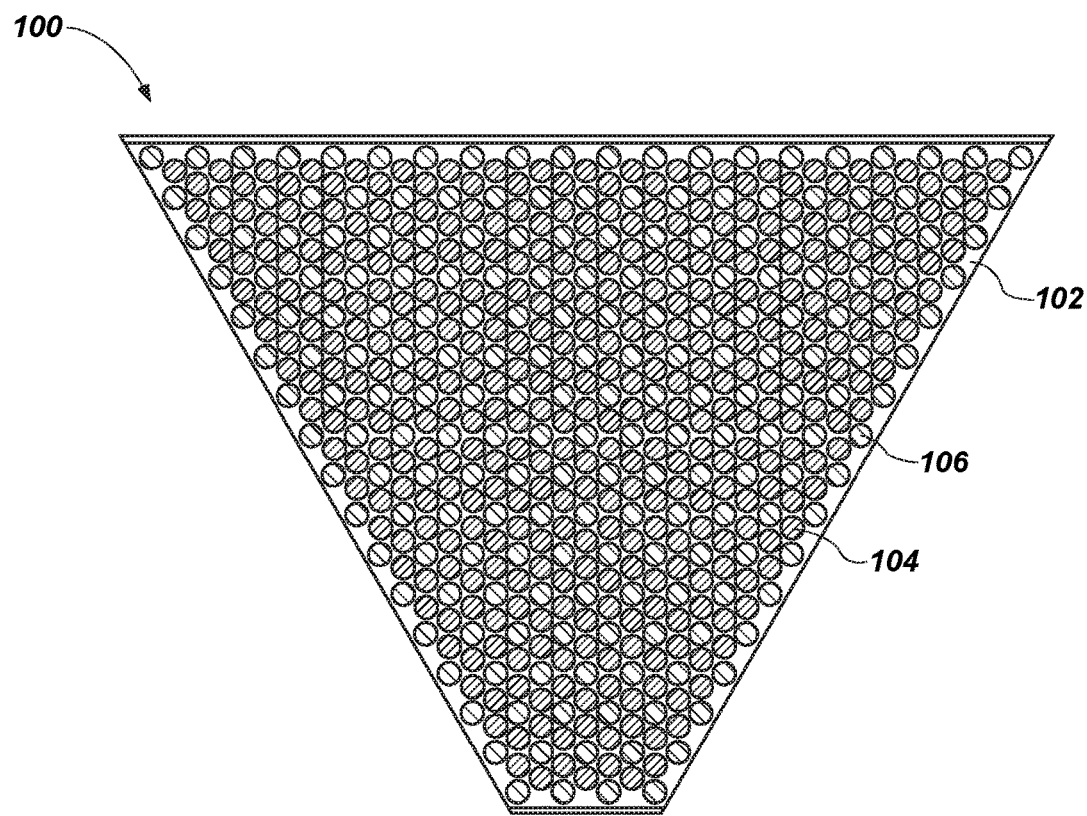
FIG. 1A is a simplified plan view of a portion of a reactor core.
Figure 1B:
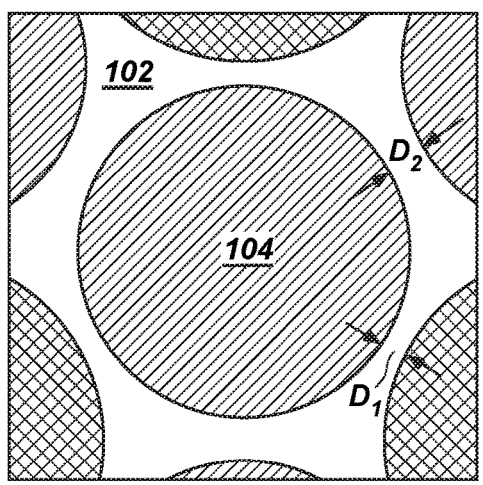
FIG. 1B and FIG. 1C are cross-sectional views of a fuel element and a heat pipe, respectively, of the reactor core of FIG. 1A.
Figure 1C:
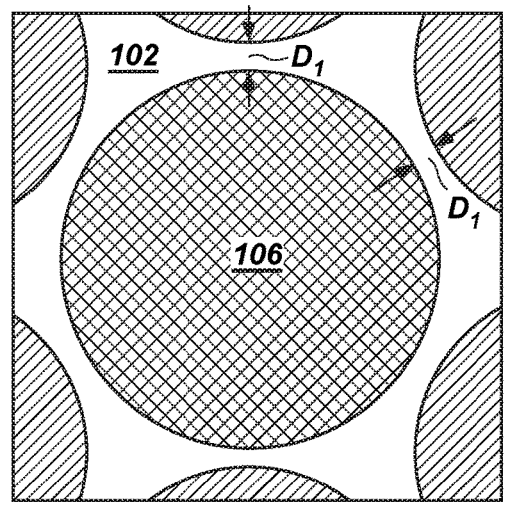

Illustrations presented herein are not meant to be actual views of any particular material, component, or system, but are merely idealized representations that are employed to describe embodiments of the disclosure.

The following description provides specific details, such as material types, dimensions, and processing conditions in order to provide a thorough description of embodiments of the disclosure. However, a person of ordinary skill in the art will understand that the embodiments of the disclosure may be practiced without employing these specific details. Indeed, the embodiments of the disclosure may be practiced in conjunction with conventional fabrication techniques employed in the industry. In addition, the description provided below does not form a complete process flow, apparatus, or system for forming a structure comprising a heat pipe integral with a fuel element, a nuclear reactor core, or a related system including the structure or the nuclear reactor core. Only those process acts and structures necessary to understand the embodiments of the disclosure are described in detail below. Additional acts to form structures comprising a heat pipe integral with a fuel element, and a nuclear reactor core may be performed by conventional techniques. Also note, any drawings accompanying the present application are for illustrative purposes only, and are thus not drawn to scale. Additionally, elements common between figures may retain the same numerical designation.

According to embodiments described herein, a structure comprising a fuel element and a heat pipe integral with the fuel element may comprise a polygonal (e.g., hexagonal) shape configured to be closely packed together with other like structures to form a nuclear reactor core comprising a plurality of the structures. The structure may comprise an outer cladding having a polygonal shape, such as a hexagonal shape. A fuel material may be disposed within the outer cladding and may directly contact inner walls of the outer cladding. In some embodiments, the fuel material may exhibit a polygonal shape, such as a hexagonal shape, substantially corresponding to the shape of the outer cladding. The fuel material may include an annular opening through a central portion thereof. A heat pipe may extend through the annular opening in the central portion of the fuel material. An inner cladding material may be disposed between the fuel material and the heat pipe. The outer cladding, the fuel material, and the heat pipe may form the structure. A plurality of structures may be grouped together to form a nuclear reactor core. In some embodiments, the structures comprise a hexagonal shape and a majority of the structures may be surrounded by about six other structures. The structures may be prefabricated and may be used to assemble a nuclear reactor core. In some embodiments, the structures may be transported to a remote location for assembly of the nuclear reactor core. The nuclear reactor core including the structures may exhibit an improved packing density of fuel elements and heat pipes relative to other nuclear reactor cores. In other words, the nuclear reactor core may comprise a reduced footprint relative to other nuclear reactor cores. In some embodiments, the nuclear reactor core may be configured to produce an increased power output relative to other nuclear reactor cores having the same weight or size.

In other embodiments, a nuclear reactor core includes a plurality of sections comprising the nuclear reactor core. Each section of the plurality of sections may be isolated and operate substantially independently of the other sections. Each section may include an inner tank housing a plurality of heat pipes and a plurality of fuel elements, each heat pipe surrounded by a plurality of fuel elements. The inner tank may be filled with a heat transfer fluid, such as, for example, sodium. The inner tank may comprise walls (e.g., a front plate, a back plate, side plates, a top plate, and a bottom plate), each comprising a material compatible with the nuclear reactor core, such as, for example, stainless steel (e.g., 316 stainless steel (about 12 atomic percent Ni, about 17 atomic percent Cr, about 2.5 atomic percent Mo, about 1.00 atomic percent silicon, about 2.00 atomic percent manganese, about 0.080 atomic percent carbon, about 0.045 atomic percent phosphorus, about 0.030 atomic percent sulfur, and a balance of iron)). The inner tank may include a plurality of grid plates disposed therein. Each grid play may comprise a plurality of apertures arranged in a predetermined pattern. Each of the heat pipes and the fuel elements may pass through an aperture of each grid plate. An outer tank, comprising an upper reflector and a lower reflector may be disposed around the inner tank and configured to contain any materials that may leak from the inner tank. Each heat pipe may extend through holes of the upper reflector and may be welded to the upper reflector to form a seal between the heat pipes and the upper reflector. The outer tank and the inner tank may comprise a section of the reactor core. A plurality of sections may be arranged in a circular pattern to form the reactor core. In some embodiments, failure of one section of the reactor core may not affect the other sections of the reactor core such that the reactor core may continue to operate despite failure of one or more of the sections.

Figure 2A:
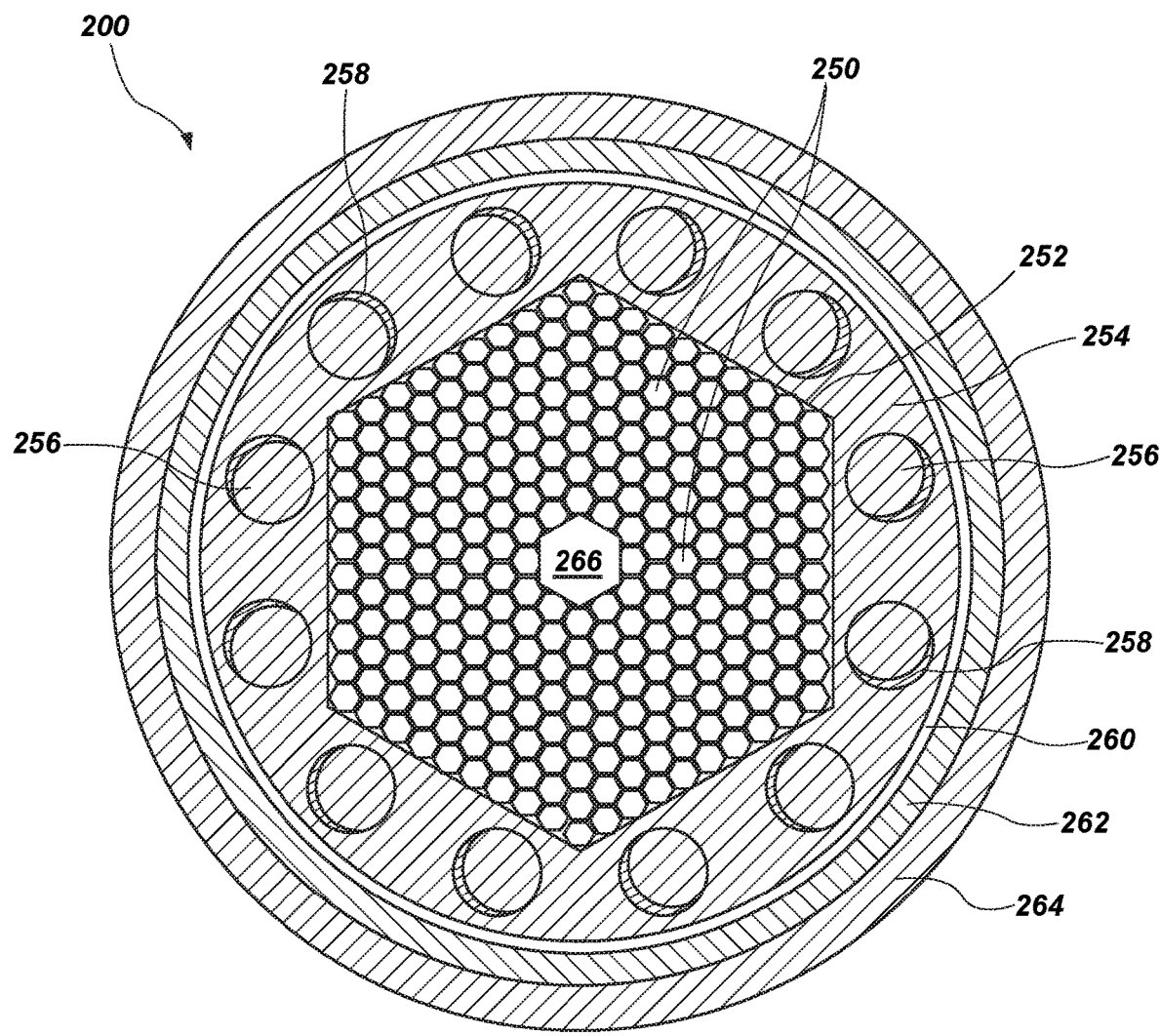
FIG. 2A is a cross-sectional view of a reactor core, according to embodiments of the disclosure.

FIG. 2A is a cross-sectional view of a reactor core 200 according to embodiments of the disclosure. The reactor core 200 may include a plurality of structures 250 each comprising a heat pipe integral with a fuel element. The structures 250 may be disposed within a central portion 252 of the reactor core 200. The central portion 252 may exhibit a polygonal shape, a square shape, a rectangular shape, a triangular shape, a hexagonal shape, a circular shape, or another shape. In some embodiments, the central portion 252 has a hexagonal shape.

A side reflector material 254 may surround the central portion 252. The side reflector material 254 may comprise a material formulated and configured to reflect neutrons and reduce or substantially prevent stray neutrons from traveling outside the reactor core 200. The side reflector material 254 comprise alumina ($Al_2O_3$), graphite, beryllium, or another reflector material. In some embodiments, the side reflector material 254 comprises alumina.

The reactor core 200 may include a plurality of control drums 256 disposed around a periphery thereof. The control drums 256 may be disposed within the side reflector material 254. The control drums 256 may each include a section comprising a reactor poison material 258 formulated and configured to stop a reaction within the reactor core 200. In some embodiments, the reactor poison material 258 comprises boron carbide ($B_4C$). The reactor poison material 258 may extend along a portion of a circumference of the control drums 256. In some embodiments, the reactor poison material 258 extends along about 120° of the circumference of the control drums 256. In use and operation, the control drums 256 may be rotated to control a reaction rate of the reactor core 200.

The reactor core 200 may further include a casing 260 disposed around the side reflector material 254. In some embodiments, the casing 260 comprises a stainless steel material. A neutron shield 262 may surround the casing 260. In some embodiments, the neutron shield 262 comprises boron carbide. The reactor core 200 may further comprise a lead gamma shield 264 disposed around the neutron shield 262. In some embodiments, an air gap may be disposed between the lead gamma shield 264 and the neutron shield 262. In some embodiments, an outer wall or casing may be disposed around the lead gamma shield 264.

The reactor core 200 may include an opening 266 defined at least by outer walls of some of the structures 250. The opening 266 may be located at a center of the central portion 252. In some embodiments, the opening 266 may be hexagonally-shaped. In other embodiments, the opening 266 may have another shape, such as a circular shape, a square shape, a rectangular shape, a polygonal shape, or another shape. The opening 266 may be configured to receive one or more control rods that may be configured to be received by the opening 266. In some embodiments, the control rods may be configured to shut down the reactor core 200, such as in an emergency situation.

Figure 2B:
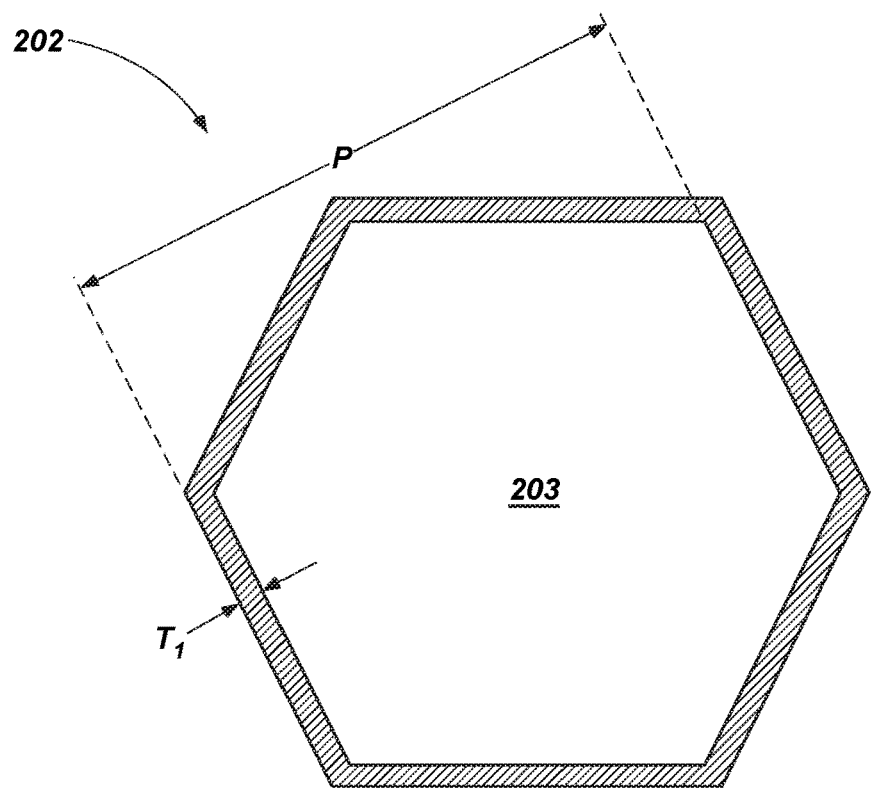
FIG. 2B is a cross-sectional view of an outer cladding material, according to embodiments of the disclosure.

Referring to FIG. 2B through FIG. 2I, the structures 250 and the components thereof are illustrated. FIG. 2B is a cross-sectional view of an outer cladding material 202 that may be used to form a structure for use in the reactor core 200 (FIG. 2A), according to embodiments of the disclosure. The outer cladding 202 may have a polygonal shape, a square shape, a rectangular shape, a triangular shape, a circular shape, a hexagonal shape, or another shape. In some embodiments, the outer cladding 202 has a hexagonal shape. A thickness $T_1$ of the outer cladding 202 may be between about 0.5 mm and about 3.0 mm, such as between about 0.5 mm and about 1.0 mm, between about 1.0 mm and about 2.0 mm, or between about 2.0 mm and about 3.0 mm. In some embodiments, the thickness $T_1$ may be equal to about 1.0 mm. An inner portion 203 of the outer cladding 202 may be defined by inner walls of the outer cladding 202.

A distance P (e.g., a pitch) between opposing sides of the outer cladding 202 may be between about 1.5 cm and about 4.0 cm, such as between about 1.5 cm and about 2.0 cm, between about 2.0 cm and about 2.5 cm, between about 2.5 cm and about 3.0 cm, or between about 3.0 cm and about 4.0 cm. In some embodiments, the distance P may be equal to about 2.7 cm or about 2.8 cm.

The outer cladding 202 may comprise a suitable material configured to contain a fuel material and any fission products thereof. The outer cladding 202 may be configured to exhibit one or more of a neutron absorption cross section, a neutron radiation resistance, a thermal expansion, a thermal conductivity, and a compatibility with a fuel material (e.g., radiation tolerant materials) and other materials of the reactor core 200 (FIG. 2A). The outer cladding 202 may comprise stainless steel (e.g., 316 stainless steel), a zirconium-based material (e.g., Zircaloy-2, Zircaloy-3, Zircaloy-4, ZrSn, ZIRLO®, etc.), silicon carbide, FeCrAl alloys, or another material. In some embodiments, the outer cladding 202 comprises 316 stainless steel. In some such embodiments, the outer cladding 202 may comprise a 316 stainless steel tube having a hexagonal shape.

Figure 2C:
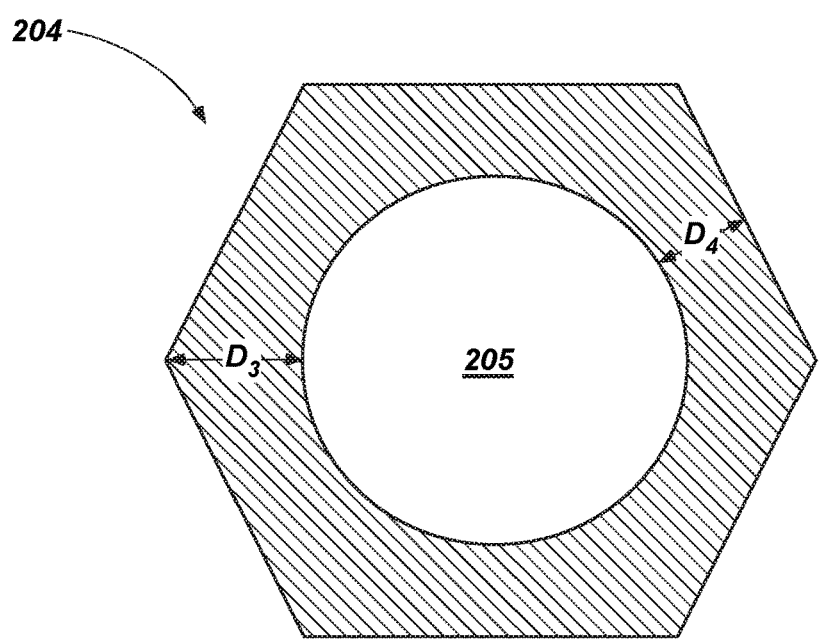
FIG. 2C is a cross-sectional view of a fuel material that may be used in the reactor core, according to embodiments of the disclosure.

FIG. 2C is a cross-sectional view of a fuel material 204 that may be used in the reactor core 200 (FIG. 2A). Fuel material 204 may have a shape substantially similar to a shape of the outer cladding 202. In some such embodiments, the fuel material 204 may be sized and shaped to be disposed within the outer cladding 202. In some embodiments, the fuel material 204 may be sized and shaped such that outer surfaces thereof directly contact inner surfaces of the outer cladding 202.

The fuel material 204 may comprise any suitable nuclear fuel. By way of nonlimiting example, the fuel material 204 may comprise low-enriched uranium dioxide ($UO_2$), uranium-zirconium (U—Zr), uranium silicide ($U_3Si_2$), uranium carbide (UC), uranium-molybdenum fuels (U—Mo), uranium nitride (UN), uranium niobium (U—Nb), uranium-beryllium ($UBe_x$) and oxides thereof (e.g., $BeO—UO_2$), alloys thereof, other fissile fuels and enrichments, and combinations thereof.

The fuel material 204 may exhibit a maximum thickness $D_3$ at locations corresponding to points of the hexagonal shape of the fuel material 204. The fuel material 204 may exhibit a minimum thickness $D_4$ at locations between points of the hexagonal shape. The maximum thickness $D_3$ may be between about 40 mm and about 70 mm, such as between about 40 mm and about 50 mm, between about 50 mm and about 60 mm, or between about 60 mm and about 70 mm. In some embodiments, the maximum thickness $D_3$ is about 54 mm. The minimum thickness $D_4$ may be between about 25 mm and about 45 mm, such as between about 25 mm and about 30 mm, between about 30 mm and about 35 mm, between about 35 mm and about 40 mm, or between about 40 mm and about 45 mm. In some embodiments, the minimum thickness $D_4$ may be about 34 mm.

The fuel material 204 may include an annular portion 205 at a center thereof. The annular portion 205 may be configured to receive a heat pipe and an inner cladding material.

Figure 2D:
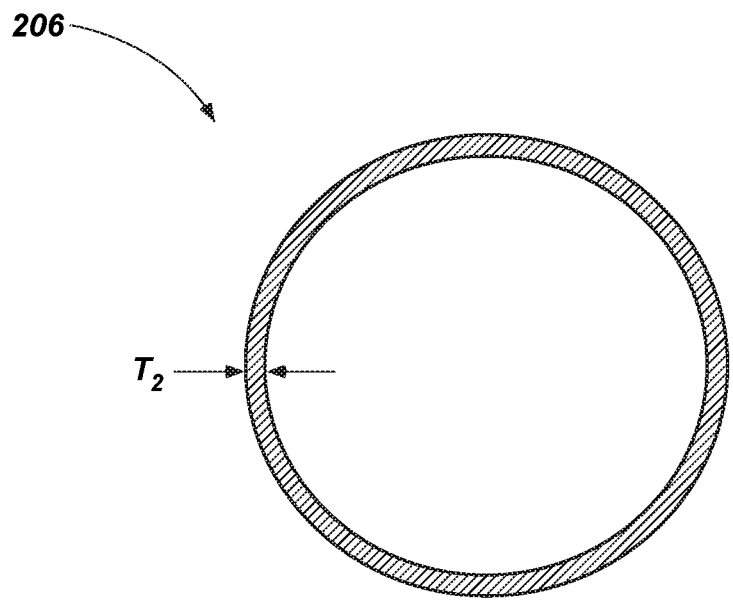
FIG. 2D is a cross-sectional view of an inner cladding configured to surround inner portions of a fuel material, according to embodiments of the disclosure.

FIG. 2D is a cross-sectional view of an inner cladding 206 configured to surround inner portions of the fuel material 204 (FIG. 2C). A thickness $T_2$ of the inner cladding 206 may be between about 0.2 mm and about 1.0 mm, such as between about 0.2 mm and about 0.4 mm, between about 0.4 mm and about 0.6 mm, or between about 0.6 mm and about 1.0 mm. In some embodiments, the thickness $T_2$ is equal to about 0.4 mm.

The inner cladding 206 may be configured to exhibit one or more of a desired neutron absorption cross section, a neutron radiation resistance, a thermal expansion, a thermal conductivity, and a compatibility with a fuel material (e.g., radiation tolerant materials) and other materials of the reactor core 200 (FIG. 2A). The inner cladding 206 may comprise stainless steel (e.g., 316 stainless steel), a zirconium-based material (e.g., Zircaloy-2, Zircaloy-3, Zircaloy-4, ZrSn, ZIRLO®, etc.), silicon carbide, FeCrAl alloys, or another material. In some embodiments, the inner cladding 206 comprises 316 stainless steel. In some embodiments, the inner cladding 206 comprises the same material as the outer cladding 202 (FIG. 2B).

Figure 2E:
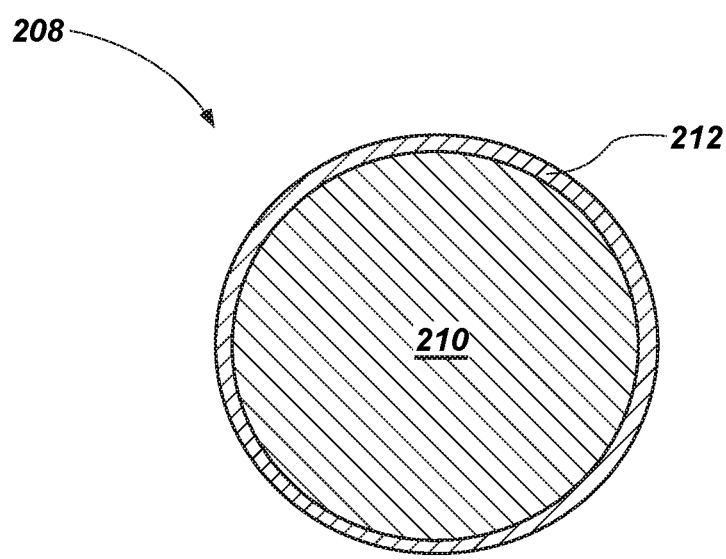
FIG. 2E is a cross-sectional view of a heat pipe, according to embodiments of the disclosure.

FIG. 2E is a cross-sectional view of a heat pipe 208. The heat pipe 208 may be sized and shaped to be disposed within the inner cladding 206 (FIG. 2D). The heat pipe 208 may comprise an outer wall 212 configured to house a heat transfer fluid 210 within the heat pipe 208. The heat transfer fluid 210 may comprise sodium, potassium, another heat transfer fluid, or mixtures thereof. The heat pipe 208 may be configured to transfer heat from the fuel material 204 to another fluid, such as in a heat exchanger of a power generation system comprising the reactor core 200 (FIG. 2A).

Figure 2F:
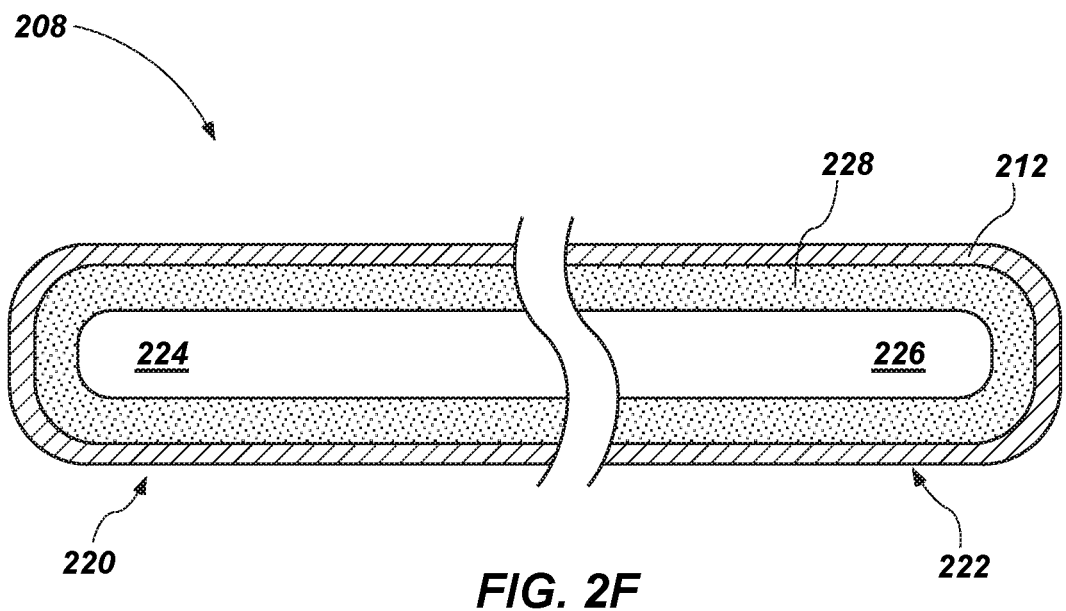
FIG. 2F is a longitudinal cross-sectional view of the heat pipe of FIG. 2E.

FIG. 2F is a longitudinal cross-sectional view of the heat pipe 208. The heat pipe 208 may comprise a first end 220 and a second end 222. The first end 220 may be exposed to thermal energy to form a vapor 224 in the first end 220. The vapor 224 may travel through the heat pipe 208 to the second end 222, which may exhibit a similar or relatively lower temperature than the first end 220. The vapor 224 may condense at the second end 222 to form a liquid 226. The liquid 226 may be absorbed by a wick 228, which may extend around a central portion of the heat pipe 208. The liquid 226 may travel back to the first end 220 via capillary forces in the wick 228. The outer wall 212 may surround the wick 228. The outer wall 212 may comprise a suitable material for use in the reactor core 200 (FIG. 2A). In some embodiments, the outer wall 212 comprises stainless steel, such as 316 stainless steel.

Figure 2G:
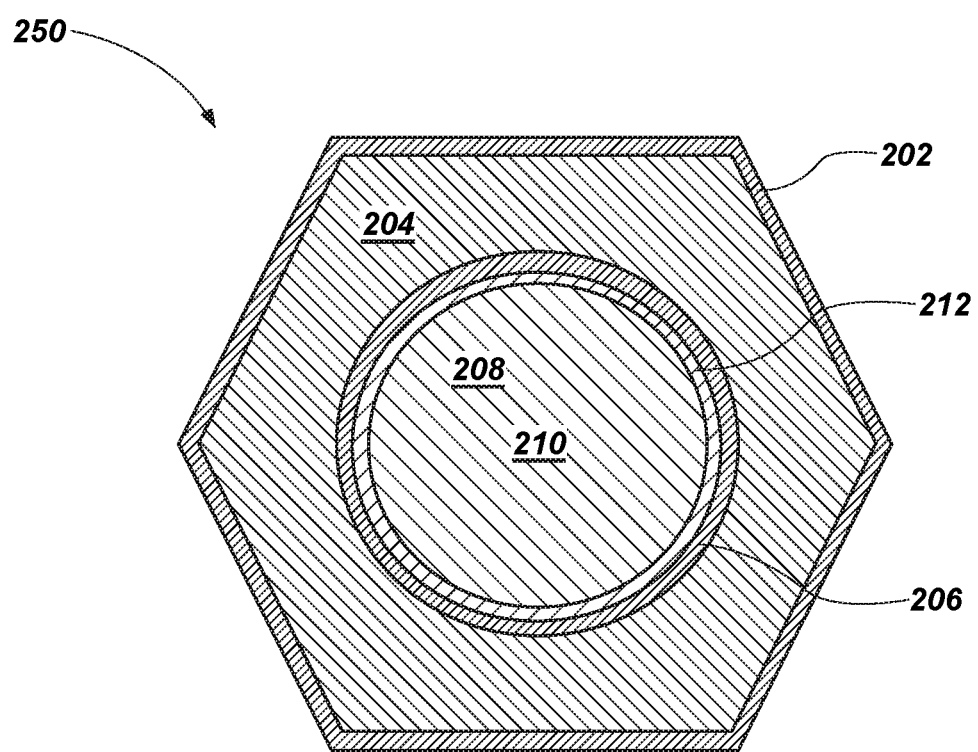
FIG. 2G is a cross-sectional view of a structure comprising a heat pipe integral with a fuel material, according to embodiments of the disclosure.

FIG. 2G is a cross-sectional view of the structure 250 in an assembled configuration. The structure 250 may include the heat pipe 208, the outer wall 212 of the heat pipe 208, the inner cladding 206 surrounding the fuel material 204 surrounding the inner cladding 206, and the outer cladding 202 surrounding the fuel material 204. In some embodiments, a volume between the outer wall 212 and the inner cladding 206 may be filled with sodium. In some embodiments, a volume of the fuel material 204 between the inner cladding 206 and the outer cladding 202 may be pressurized with helium gas.

Figure 2H:
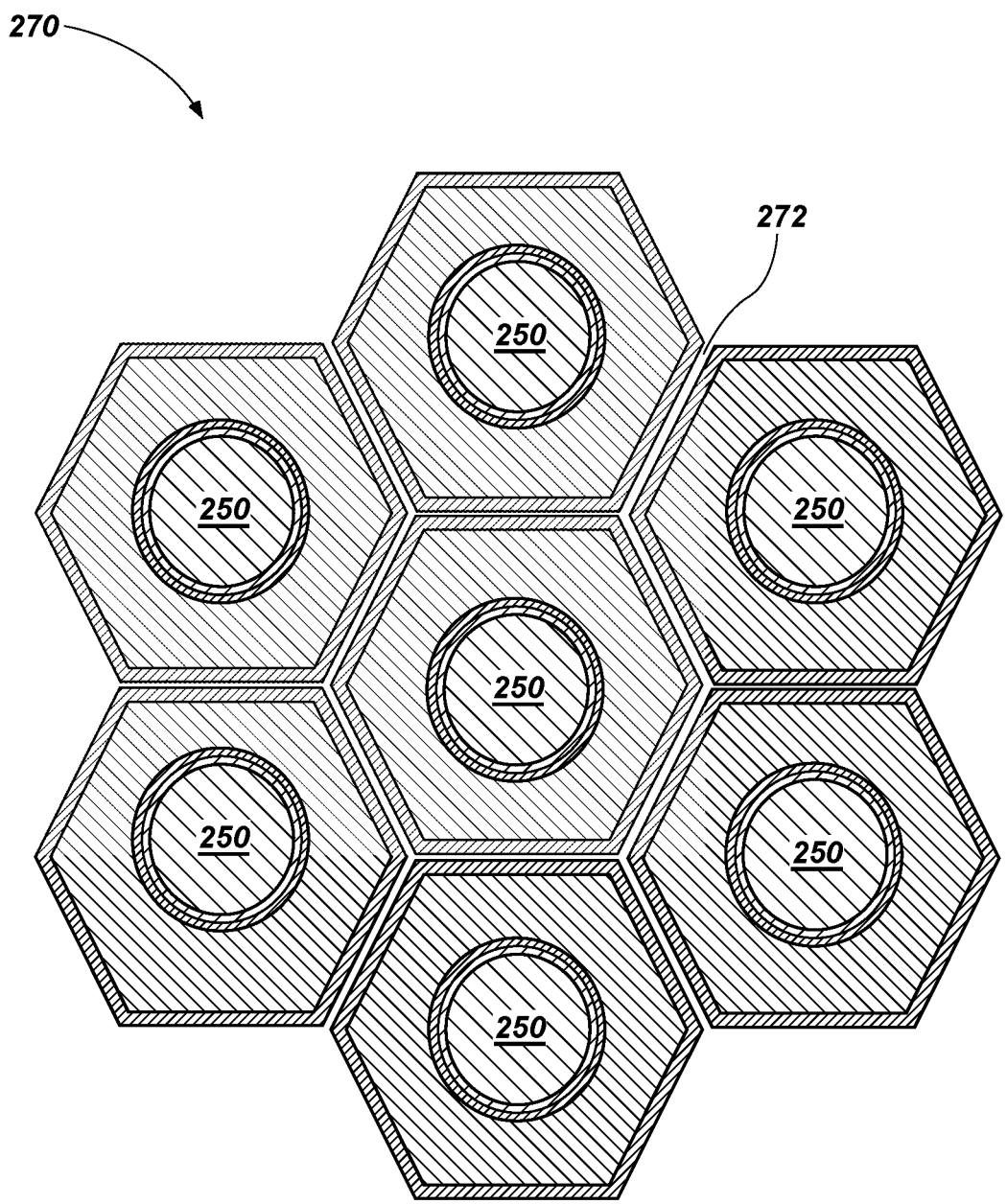
FIG. 2H is a cross-sectional view of a cluster of the structures.

A shape of the structure 250 may be defined by a shape of the outer cladding 202. The shape of the structure 250 may be such that a plurality of structures 250 may be grouped together without a substantial space between adjacent structures 250, as illustrated in FIG. 2H, a cluster 270 of the structures 250 may be grouped together. The shape of the structure 250 may facilitate an increased packing density of fuel elements (e.g., fuel rods, fuel pins, etc.) within the reactor core 200 (FIG. 2A). In some embodiments, the structure 250 may exhibit a hexagonal shape. In some embodiments, adjacent structures 250 may be separated by a gap 272. In other embodiments, adjacent structures 250 may directly contact each other.

Figure 2I:
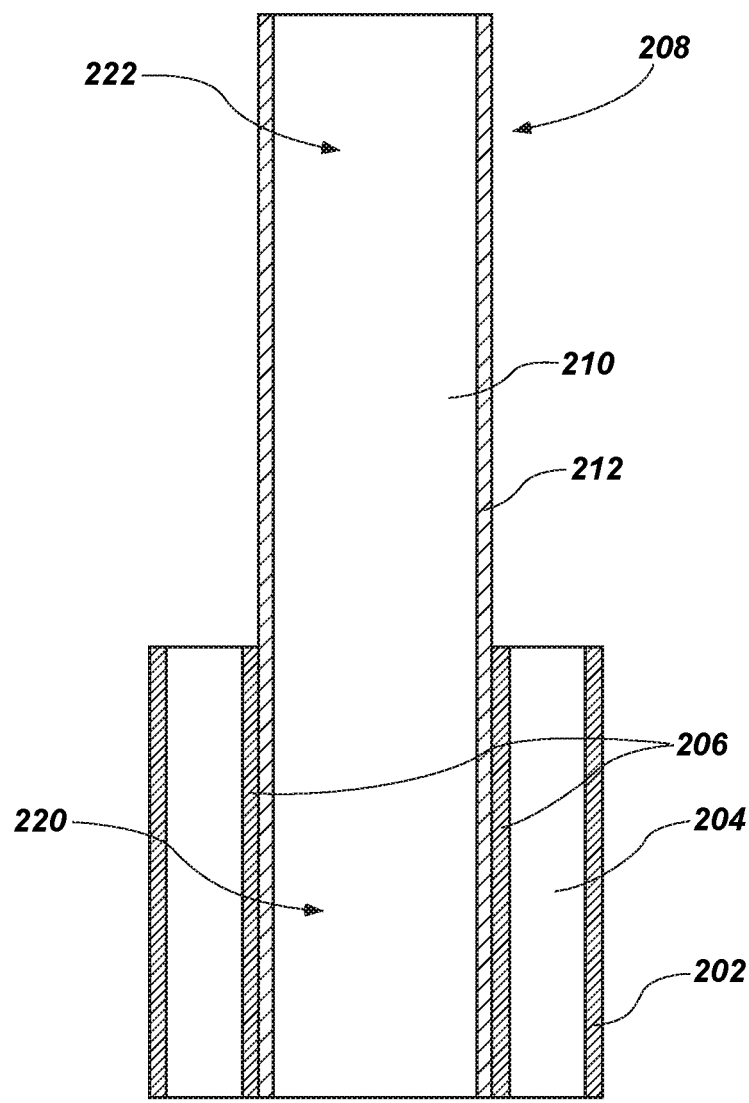
FIG. 2I is a longitudinal cross-sectional view of the structure of FIG. 2G.

FIG. 2I is a longitudinal cross-sectional view of the structure 250 (FIG. 2A). The structure 250 includes the heat pipe 208 at a central portion thereof. The fuel material 204, the outer cladding 202, and the inner cladding 206 may extend only a portion of a length of the structure 250. The heat pipe 208 may extend beyond each of the fuel material 204, the outer cladding 202, and the inner cladding 206. By way of nonlimiting example, the first end 220 of the heat pipe 208 may be surrounded by the fuel material 204, the inner cladding 206, and the outer cladding 202. The second end 222 of the heat pipe 208 may not be surrounded by the fuel material 204, the inner cladding 206, and the outer cladding 202. In some embodiments, the heat pipe 208 extends about 2.5 meters beyond the fuel material 204, the inner cladding 206, and the outer cladding 202. In some embodiments, the second end 222 may be located proximate one or more structures for transferring heat from the second end 222 to another material or fluid, such as in a heat exchanger, as will be described herein. In some embodiments, the second end 222 of the heat pipe 208 may extend through one or more of an upper reflector, a fission gas plenum, a shield, and one or more heat exchangers.

In some embodiments, the reactor core 200 may comprise a plurality of the structures 250. By way of nonlimiting example, the reactor core 200 may comprise about 1,224 of the structures 250, although the reactor core 200 is not so limited and may include any number of the structures 250. For example, in some embodiments, the reactor core 200 may comprise at least about 500 structures 250, at least about 750 structures 250, at least about 1,000 structures 250, at least about 1,500 structures 250, or at least about 2,000 structures 250.

In some embodiments, the structures 250 may be prefabricated prior to assembly of the reactor core 200 (FIG. 2A). Each structure 250 may comprise a heat pipe 208 that is integral with a fuel material 204. The fuel material 204 may be surrounded by a cladding material (e.g., outer cladding 202 and inner cladding 206). The heat pipe 208 may be configured to transfer heat from the fuel material 204 to another medium to produce power, as will be described herein. The reactor core 200 including the structures 250 may exhibit a higher effective k value (effective neutron multiplication factor and hence, a greater reactivity) than conventional reactor cores comprising separate fuel elements and heat pipes (i.e., reactor cores wherein the heat pipes are not integral with the fuel elements). Without wishing to be bound by any particular theory, it is believed that the higher effective k value is due to a greater packing density of the structures 250 including the fuel material 204 and integral heat pipes 208 compared to a packing density of relatively isolated heat pipes and fuel elements in conventional reactor cores. In some embodiments, the reactor core 200 may be configured to provide between about 2 MW and about 8 MW of power, such as about 5 MW of power.

Figure 3:
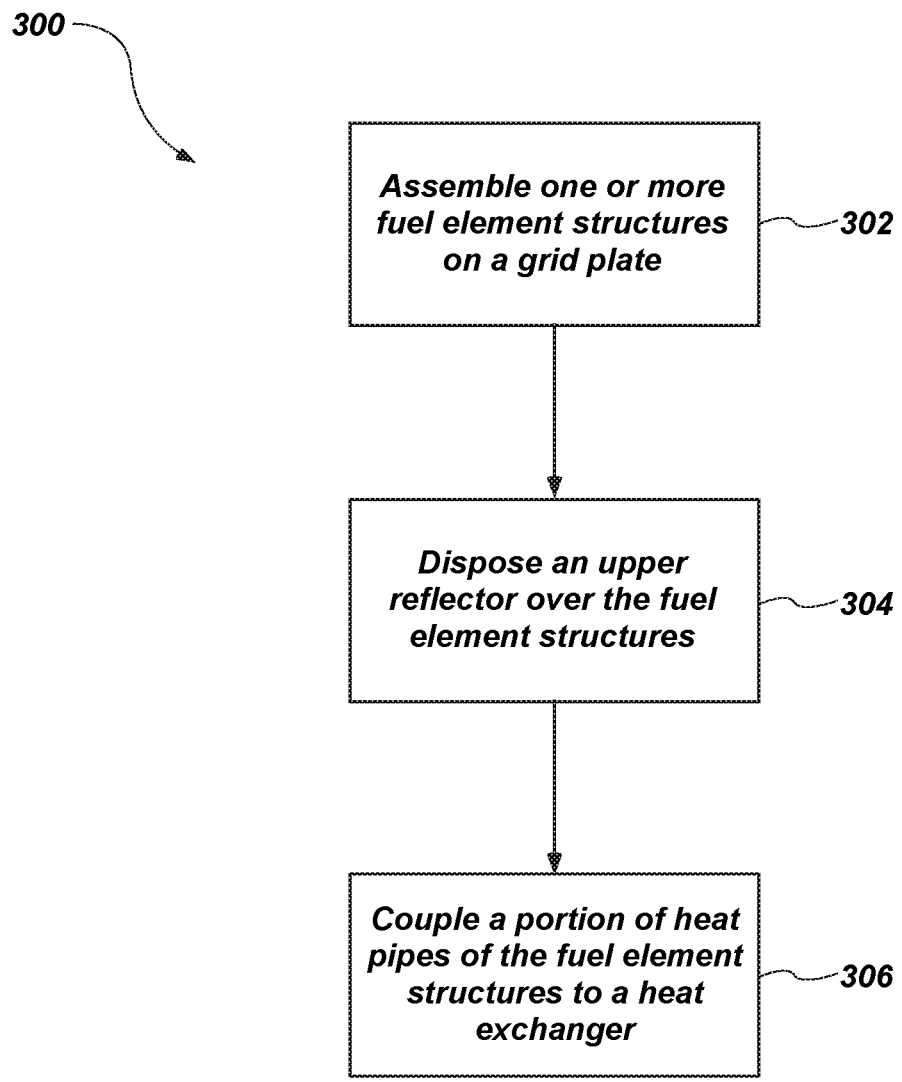
FIG. 3 is a flowchart illustrating a method of assembling a reactor core, according to embodiments of the disclosure.

The structures 250 may facilitate relatively simple assembly of a reactor core 200. FIG. 3 is a flowchart illustrating a method 300 of assembling a reactor core, according to embodiments of the disclosure. The method 300 includes act 302 including assembling one or more fuel element structures on a grid plate; act 304 including disposing an upper reflector over the fuel element structures; and act 306 including coupling a portion of the heat pipes to a heat exchanger.

Act 302 includes assembling one or more fuel element structures on a grid plate. The fuel element structures may be substantially the same as the structures 250 described above with reference to FIG. 2G. Accordingly, the structures may each comprise a heat pipe integral with a fuel element. The grid plate may comprise a plurality of openings or cavities for receiving the structures. In some embodiments, the grid plate comprises a pattern of openings or cavities substantially similar to the pattern of the central portion 252 in FIG. 2A. In some embodiments, the grid plate comprises a plurality of hexagonally-shaped openings or cavities for receiving each of the structures. The structures may be closely spaced, as illustrated in FIG. 2A and FIG. 2H.

Act 304 includes disposing an upper reflector over the fuel element structures. The upper reflector may comprise a suitable reflector material for use in a nuclear reactor core. By way of nonlimiting example, the upper reflector may comprise stainless steel, beryllium oxide (BeO), or another material. In some embodiments, a portion of the heat pipes of the fuel element structures may extend beyond the upper reflector. In some such embodiments, the heat pipes may pass through apertures in the upper reflector.

Act 306 includes coupling a portion of the heat pipes to a heat exchanger. The heat exchanger may be configured to transfer heat from the heat pipes to another fluid. Thermal energy in the another fluid may be used for power generation, such as in, for example, a turbine, as may be understood by one of ordinary skill in the art.

Figure 4A:
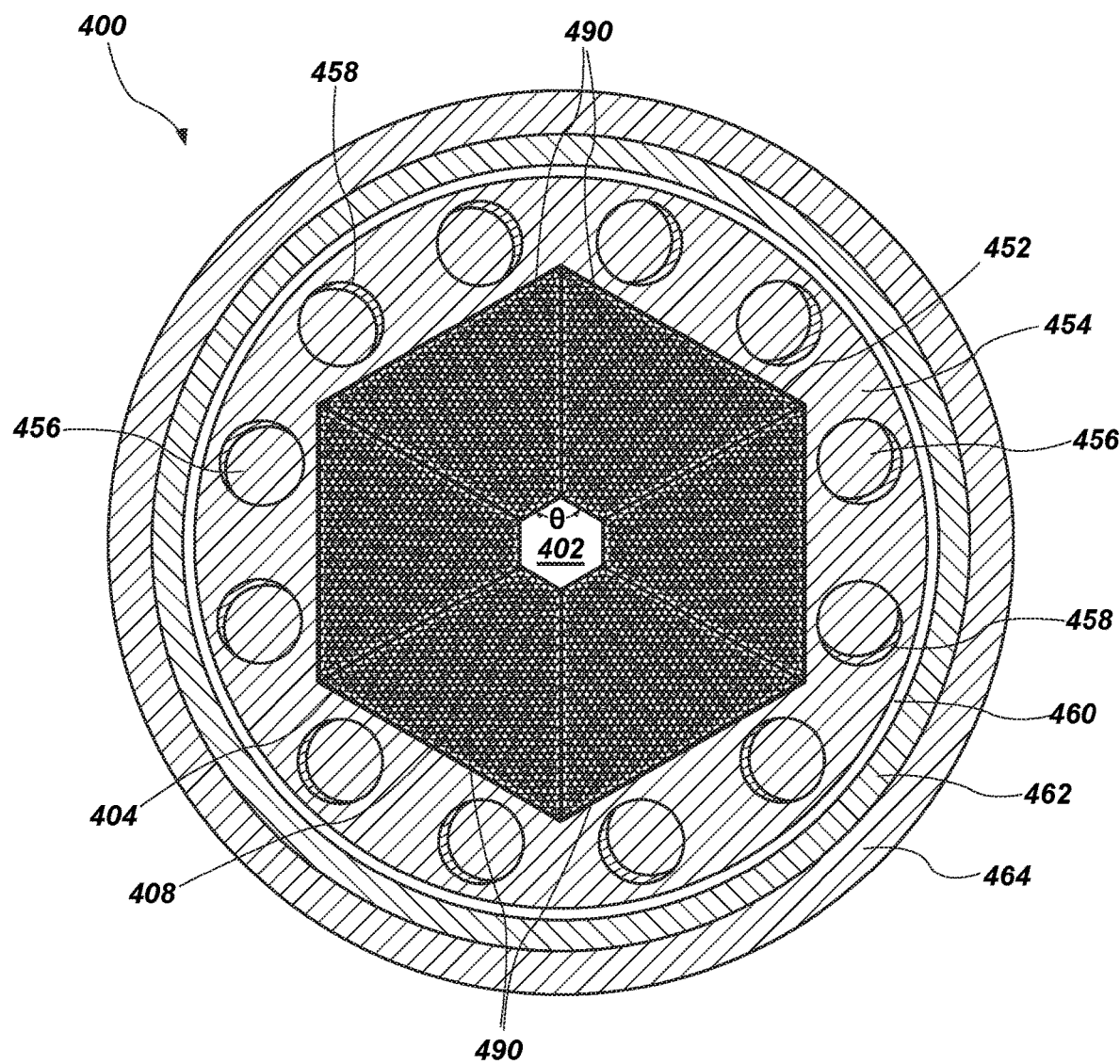
FIG. 4A is a cross-sectional view of a reactor core, according to embodiments of the disclosure.

FIG. 4A is a cross-sectional view of a reactor core 400, according to other embodiments of the disclosure. The reactor core 400 may be similar to the reactor core 200 (FIG. 2A), but the reactor core 400 may include a different central portion 452. The reactor core 400 may include a side reflector material 454 surrounding the central portion 452. The side reflector material 454 may be substantially the same as the side reflector material 254 described above with reference to FIG. 2A. The reactor core 400 may further include a plurality of control drums 456 including a reactor poison material 458, a casing 460, a neutron shield 462, a lead gamma shield 464, and an outer wall, each of which may be substantially similar to like structures described above with reference to FIG. 2A.

The central portion 452 of the reactor core 400 may include a plurality of sections 490. The central portion 452 may exhibit a hexagonal shape, a circular shape, a polygonal shape, a square shape, a rectangular shape, a triangular shape, or another shape. In some embodiments, the central portion 452 may be arranged in a hexagonal shape. In some such embodiments, each section 490 of the plurality of sections 490 may comprise a portion of a hexagon.

The sections 490 may be arranged in a hexagonal pattern. In some embodiments, a center of the reactor core 400 may comprise an opening 402. The opening 402 may have a circular shape, a hexagonal shape, or another shape. In some embodiments, the opening 402 has a circular shape. The opening 402 may be sized and shaped to receive one or more control rods and may be used for reactor control.

The reactor core 400 may include between about two sections and about twelve sections 490, such as about six sections. Angle θ may determine a number of sections 490 in the reactor core 400. By way of nonlimiting example, where θ comprise about 60°, the reactor core 400 may comprise six sections 490.

Each section 490 may include a plurality of heat pipes 408 and a plurality of fuel elements 404. Although FIG. 4A illustrates each section 490 as including a certain number and pattern of heat pipes 408 and fuel elements 404, the disclosure is not so limited. In some embodiments, each section 490 may include between about 100 and about 300 heat pipes 408, such as between about 125 and about 275, between about 150 and about 250, or between about 175 and about 225 heat pipes 408. In some embodiments, each section 490 may include about 204 heat pipes 408. Each section 490 may include between about 200 and about 500 fuel elements 404, such as between about 250 and about 450, or between about 300 and about 400 fuel elements 404. In some embodiments, each section comprises about 352 fuel elements 404. In some embodiments, the central portion 452 is configured such that reactor control blades may be disposed between adjacent sections 490 to control the reactor core 400.

Figure 4B:
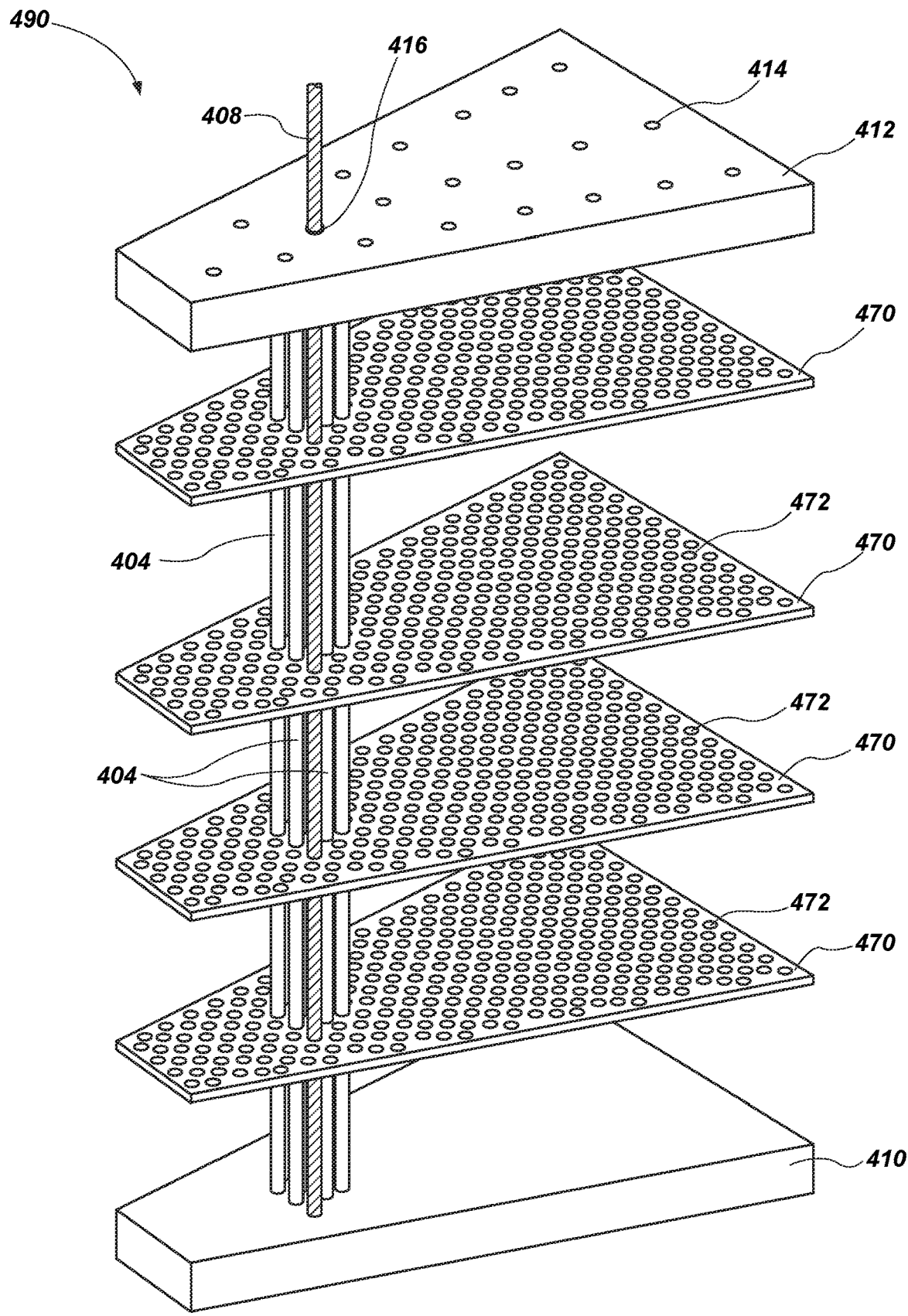
FIG. 4B is a perspective view of a partially assembled section of the reactor core of FIG. 4A, according to embodiments of the disclosure.
Figure 4C:
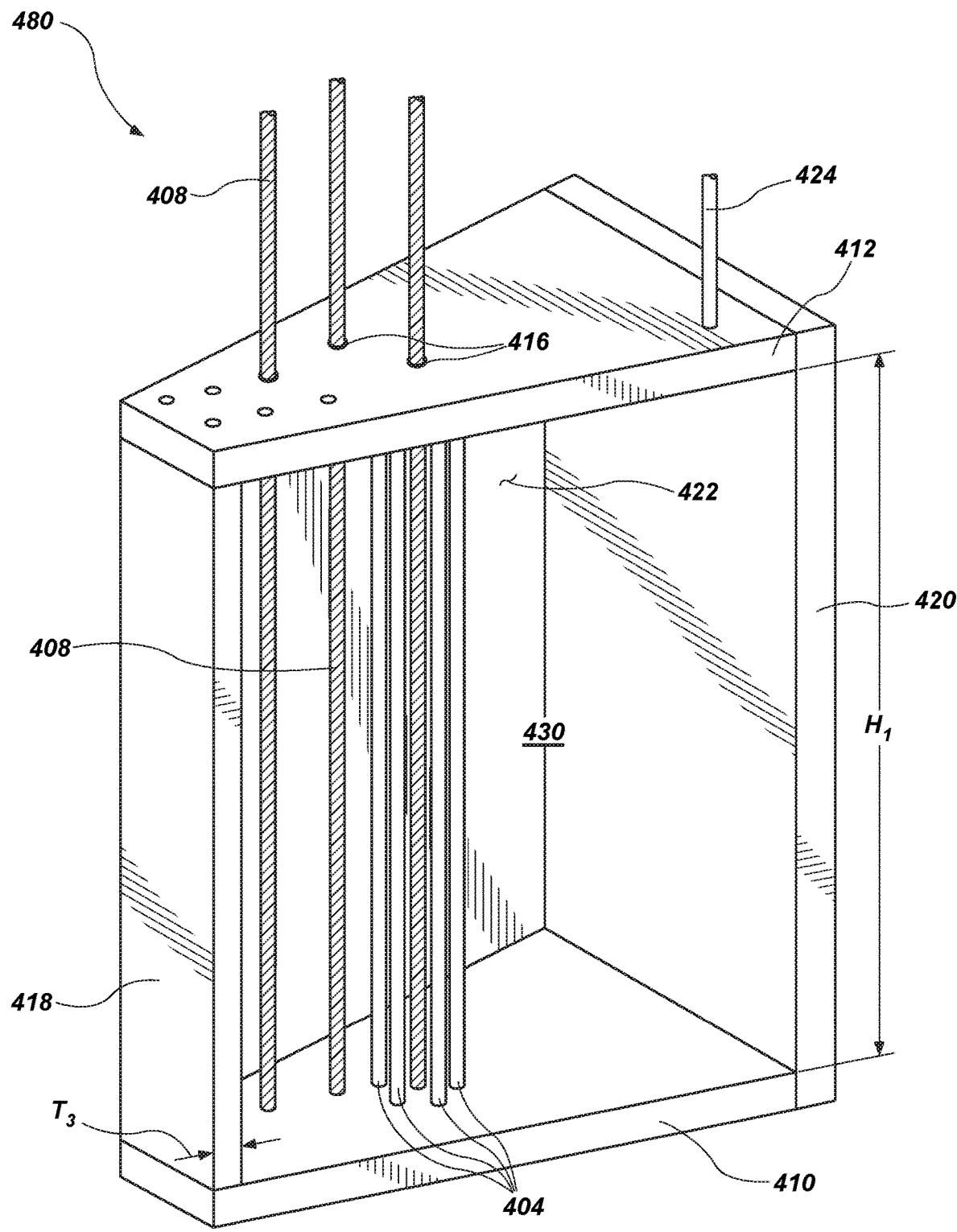
FIG. 4C is a perspective view of an inner tank of a section of the reactor core of FIG. 4A, according to embodiments of the disclosure.
Figure 4D:
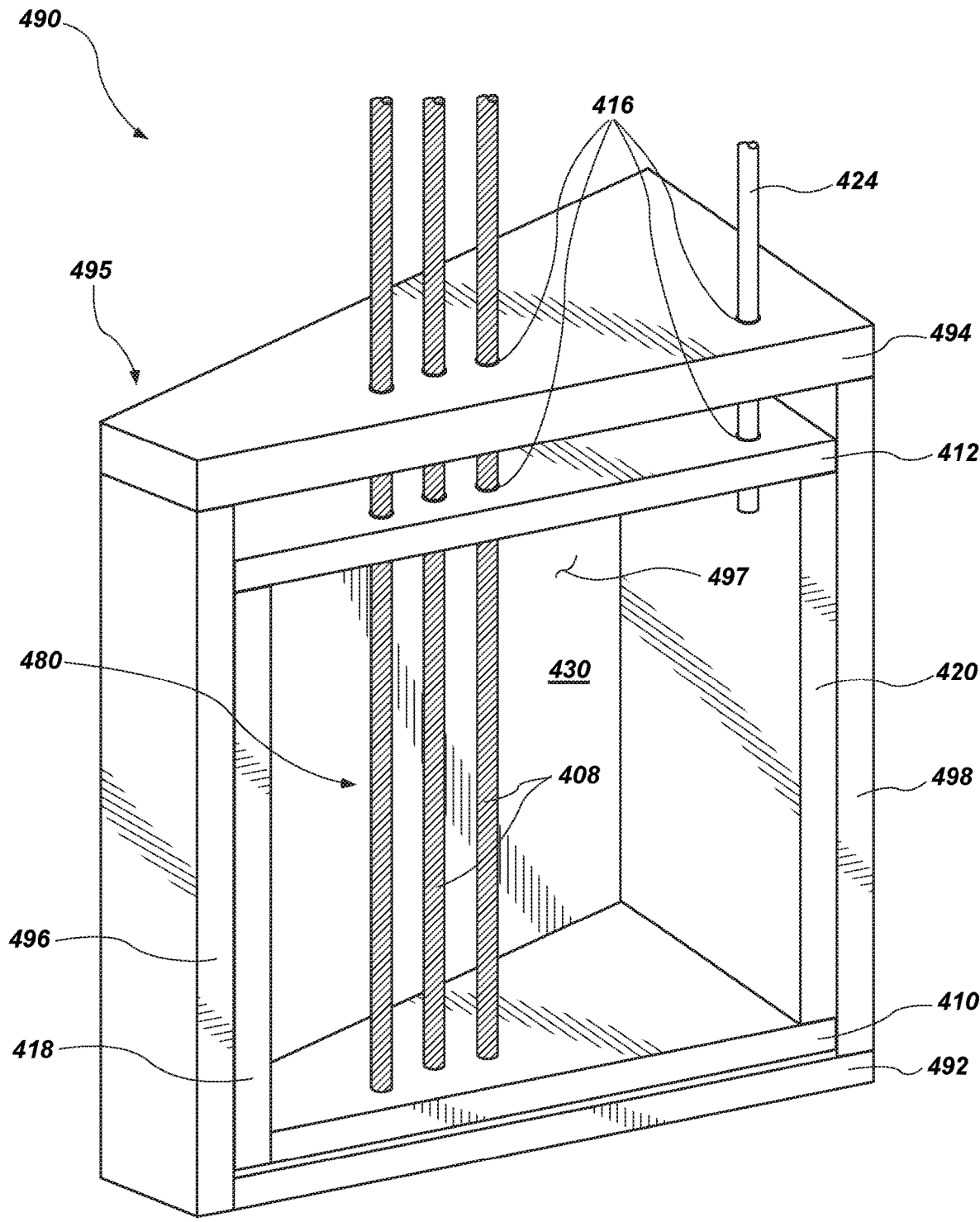
FIG. 4D is a perspective view of a section of the reactor core of FIG. 4A, according to embodiments of the disclosure.

FIG. 4B through FIG. 4D are perspective views of a section 490 of the reactor core 400 of FIG. 4A. FIG. 4B is a perspective view of a partially assembled section 490. The section 490 may include a plurality of heat pipes 408 and a plurality of fuel elements 404 (e.g., fuel pins, fuel rods, etc.), only a few of which are illustrated for clarity.

The section 490 may include a bottom plate 410 and a top plate 412. The plurality of heat pipes 408 and the plurality of fuel elements 404 may extend from a top of the bottom plate 410 to a bottom of the top plate 412. A bottom of each of the fuel elements 404 and each of the heat pipes 408 may be received in respective cavities in the bottom plate 410. The bottom plate 410 may be configured to orient and position each of the fuel elements 404 and each of the heat pipes 408 in the section 490 relative to one another. For example, the bottom plate 410 may be configured to orient the heat pipes 408 such that a majority of the heat pipes 408 are surrounded by about six fuel elements 404, similar to the pattern of heat pipes 106 and fuel elements 104 described above with reference to FIG. 1A.

The section 490 may include a plurality of grid plates 470 interspersed between the bottom plate 410 and the top plate 412. The grid plates 470 may be configured to align the heat pipes 408 and the fuel elements 404 with respect to each other. In other words, the grid plates 470 may be configured to orient the heat pipes 408 and the fuel elements 404 in a desired pattern. In some embodiments, the heat pipes 408 may be arranged such that substantially all of the heat pipes 408 are closer to fuel elements 404 than to other heat pipes 408. In some embodiments, each heat pipe 408 may be surrounded by a plurality of fuel elements 404.

The section 490 may include between about two grid plates 470 and about fifteen grid plates 470, such as between about three grid plates 470 and about twelve grid plates 470, between about four grid plates 470 and about ten grid plates 470, or between about five grid plates 470 and about eight grid plates 470. In some embodiments, the section 490 comprises about four grid plates 470.

The grid plates 470 may each include a plurality of apertures 472 formed therein. The apertures 472 may be configured to receive the heat pipes 408 and the fuel elements 404. In some embodiments, the apertures 472 may include a sufficient tolerance (e.g., about 0.010 inch) to allow the heat pipes 408 and fuel elements 404 to pass therethrough. Each grid plate 470 may include a same number of total apertures 472 as a total number of heat pipes 408 and fuel elements 404 in the section of the reactor core 400 (FIG. 4A). In some embodiments, apertures 472 configured to receive the heat pipes 408 may be sized differently than apertures 472 configured to receive the fuel elements 404, facilitating simple fabrication of the reactor core 400. In some embodiments, each of the grid plates 470 includes a same number of apertures 472 and in a same pattern as the other grid plates 470.

The heat pipes 408 may extend through the top plate 412 to a location where heat may be transferred from the heat pipes 408 to another fluid. The heat pipes 408 may be substantially similar to the heat pipe 208 described above with reference to FIG. 2E and FIG. 2F. In some embodiments, the heat pipes 408 comprise an outer portion comprising the same material as the top plate 412 (e.g., stainless steel, such as 316 stainless steel). The heat pipes 408 may be filled with sodium, potassium, or a combination thereof. In some embodiments, the heat pipes 408 are filled with sodium. The heat pipes 408 may extend from a top of the bottom plate 410, through the apertures 472 in the grid plates 470, and through an aperture 414 in the top plate 412. Each of the heat pipes 408 may be welded at regions 416 at an interface between the heat pipe 408 and a top of the top plate 412.

The fuel elements 404 may comprise any suitable fuel for use in a nuclear reactor. By way of nonlimiting example, the fuel elements 404 may comprise low-enriched uranium dioxide ($UO_2$), uranium-zirconium (U—Zr), uranium silicide ($U_3Si_2$), uranium carbide (UC), uranium-molybdenum fuels (U—Mo), uranium nitride (UN), uranium niobium (U—Nb), uranium-beryllium ($UBe_x$) and oxides thereof (e.g., $BeO$—$UO_2$), alloys thereof, other fissile fuels and enrichments, and combinations thereof. In some embodiments, the fuel elements 404 may comprise fuel rods, filled with pellets of the nuclear fuel. In some embodiments, the fuel elements 404 are surrounded with a cladding material.

FIG. 4C is a perspective view of an inner tank 480 of a section 490 (FIG. 4A). Each section 490 may comprise an inner tank 480. For clarity, the grid plates 470 and the fuel elements 404 are not illustrated in FIG. 4C, but it will be understood that the inner tank 480 includes the grid plates 470, the heat pipes 408, and the fuel elements 404 extending therethrough.

The inner tank 480 may enclose a volume 430 defined by the bottom plate 410, a front plate 418, a back plate 420, the top plate 412, and a pair of opposing side plates 422 (one of which is not shown to show the volume 430). Each of the bottom plate 410, the front plate 418, the back plate 420, the top plate 412, and the side plates 422 may comprise a stainless steel material, such as 316 stainless steel.

Each of the bottom plate 410, the front plate 418, the back plate 420, the top plate 412, and the side plates 422 may have a thickness $T_3$ equal to between about 0.25 cm and about 1.0 cm, such as between about 0.4 cm and about 0.8 cm, or between about 0.5 cm and about 0.7 cm. In some embodiments, each of the bottom plate 410, the front plate 418, the back plate 420, the top plate 412, and the side plates 422 has a thickness $T_3$ of about 0.5 cm. However, the disclosure is not so limited and the thickness of each of the bottom plate 410, the front plate 418, the back plate 420, the top plate 412, and the side plates 422 may be different.

A height $H_1$ of the inner tank 480 (e.g., a height of the front plate 418 and the back plate 420) may be between about 100 cm and about 200 cm, such as between about 120 cm and about 180 cm, or between about 140 cm and about 160 cm. In some embodiments, the height $H_1$ is equal to about 150 cm.

In some embodiments, each of the plates may be welded to adjacent plates. By way of nonlimiting example, the bottom plate 410 may be welded to each of the front plate 418, the back plate 420, and the side plates 422, the front plate 418 may be welded to the bottom plate 410, the side plates 422, and the top plate 412, the back plate 420 may be welded to the bottom plate 410, the side plates 422, and the top plate 412, the side plates 422 may be welded to the bottom plate 410, the front plate 418, the back plate 420, and the top plate 412, and the top plate 412 may be welded to the front plate 418, the back plate 420, and the side plates 422. In some embodiments, each of the bottom plate 410, the front plate 418, the back plate 420, the side plates 422, and the top plate 412 comprise the same material (e.g., stainless steel, such as 316 stainless steel), facilitating welding of similar metals together.

A fill tube 424 may extend through an opening in the top plate 412 into the volume 430. The fill tube 424 may facilitate filling the volume 430 with one or more materials. In some embodiments, the volume 430 is filled with a heat transfer fluid. The heat transfer fluid may facilitate improved heat transfer between the fuel elements 404 and the heat pipes 408. Accordingly, the inner tank 480 may be filled with a heat transfer fluid, which may substantially fill the volume 430 in the inner tank 480 and contact each of the heat pipes 408 and each of the fuel elements 404. In some embodiments, the heat transfer fluid may form a thermal bond with the heat pipes 408 and the fuel elements 404. With reference again to FIG. 4B, it will be understood that the volume 430 between adjacent grid plates 470 may be substantially filled with the heat transfer fluid such that there are substantially no air or voids in the volume 430. The heat transfer fluid may comprise sodium, potassium, or a combination thereof. In some embodiments, the heat transfer fluid comprises sodium. In some such embodiments, the heat transfer fluid may be compatible with a fluid in the heat pipes 408. By way of nonlimiting example, a fluid in the heat pipes 408 may comprise potassium and the heat transfer fluid may comprise sodium. In some embodiments, the heat transfer fluid may be configured to boil at a temperature higher than about 880° C., such as where the heat transfer fluid comprises sodium. By way of comparison, conventional reactor cores may have maximum operating temperatures of about 700° C.

FIG. 4D is a perspective view of a section 490 of a reactor core 400 (FIG. 4A). The section 490 includes an outer tank 495 in which the inner tank 480 is contained. The outer tank 495 may include a lower reflector 492, an upper reflector 494, a front wall 496, a back wall 498, and side walls 497 (one of which is not shown so that the volume 430 may be seen).

In some embodiments, each of the lower reflector 492, the upper reflector 494, the front wall 496, the back wall 498, and the side walls 497 may comprise a neutron reflector (i.e., a material configured to reflect neutrons). In some embodiments, the lower reflector 492, the upper reflector 494, the front wall 496, the back wall 498, and the side walls 497 may comprise a stainless steel material (e.g., 316 stainless steel). In other embodiments, each of the lower reflector 492, the upper reflector 494, the front wall 496, the back wall 498, and the side walls 497 may comprise graphite, beryllium, tungsten, or other reflector material.

In some embodiments, each of the lower reflector 492, the upper reflector 494, the front wall 496, the back wall 498, and the side walls 497 may comprise the same material. In some embodiments, each of the lower reflector 492, the upper reflector 494, the front wall 496, the back wall 498, and the side walls 497 may comprise the same material as each of the bottom plate 410, the front plate 418, the back plate 420, the top plate 412, and the side plates 422. In some such embodiments, each of the lower reflector 492, the upper reflector 494, the front wall 496, the back wall 498, and the side walls 497 may comprise 316 stainless steel.

As illustrated in FIG. 4D, each of the heat pipes 408 may extend from the top of the bottom plate 410 through the top plate 412 and through the upper reflector 494. Each heat pipe 408 may be welded to the upper reflector 494 at regions 416 at an interface between the heat pipes 408 and the upper surface of the upper reflector 494.

As described above, the volume 430 may be filled with a heat transfer fluid. The heat transfer fluid may form an effective and ideal thermal bond between the fuel elements 404 and the heat pipes 408. The heat transfer fluid may distribute heat uniformly throughout the volume 430 through conductive and convective fluid heat transfer mechanisms. In some embodiments, the heat transfer fluid in the volume 430 may facilitate uniform heating of the heat pipes 408 in the reactor core 400, reducing a potential for cascade heat pipe failures and reducing localized fuel element and heat pipe "hot spots" (i.e., regions of the fuel elements 404 and the heat pipes 408 that exhibit a relatively higher temperature than other portions of the fuel elements 404 and the heat pipes 408). The heat transfer fluid may not be subject to thermal stresses as a monolithic structure may be.

Due to the relatively small size of the sections 490 and the reactor core 400, a relatively small volume of the heat transfer fluid may be required compared to conventional reactor cores. In use and operation, the material in the volume 430 may be sealed from an outside of the section 490 by at least the inner tank 480 and the outer tank 495. Since the heat pipes 408 are sealed at the regions 416 and the plates are welded together, the inner tank 480 may comprise a pressure sealed vessel. Similarly, since the heat pipes 408 are sealed at the regions 416 between the heat pipes 408 and the upper reflector 494, any material that may have leaked from the inner tank 480 may be confined within the outer tank 495. In some embodiments, loss of any of the heat transfer fluid from one of the sections 490 may provide an indication a loss of reactivity. In other words, a reactivity of the reactor core 400 may decrease as the heat transfer fluid leaks from the inner tank 480. In addition, the loss of any heat transfer fluid may be isolated to only one section 490 of the reactor core 400 rather than the entirety of the reactor core 400.

Accordingly, the reactor core 400 (FIG. 4A) may be configured to be assembled in remote locations with prefabricated materials. The reactor core 400 may be assembled with prefabricated fuel elements and prefabricated heat pipes. The grid plates may be relatively easy to manufacture compared to a monolithic structure or other structure of conventional reactor cores. Since the reactor core 400 does not include a monolithic structure, a weight of the reactor core 400 may be reduced compared to prior art reactor cores. Grid plates 470 with predrilled apertures 472 patterned in a desired configuration may be used to align the heat pipes 408 and the fuel elements 404 in each section 490.

Forming the reactor core 400 in a plurality of sections 490 may facilitate relatively easy reactor assembly relative to assembly of other reactor cores. In addition, the plurality of sections 490 may reduce or prevent criticality mishaps during transport, assembly, and operation of the reactor core 400. In some embodiments, if one of the sections 490 of the reactor core 400 fails during operation, the other sections 490 may continue to retain structural integrity and operate without failure of the entirety of the reactor core 400.

Figure 5:
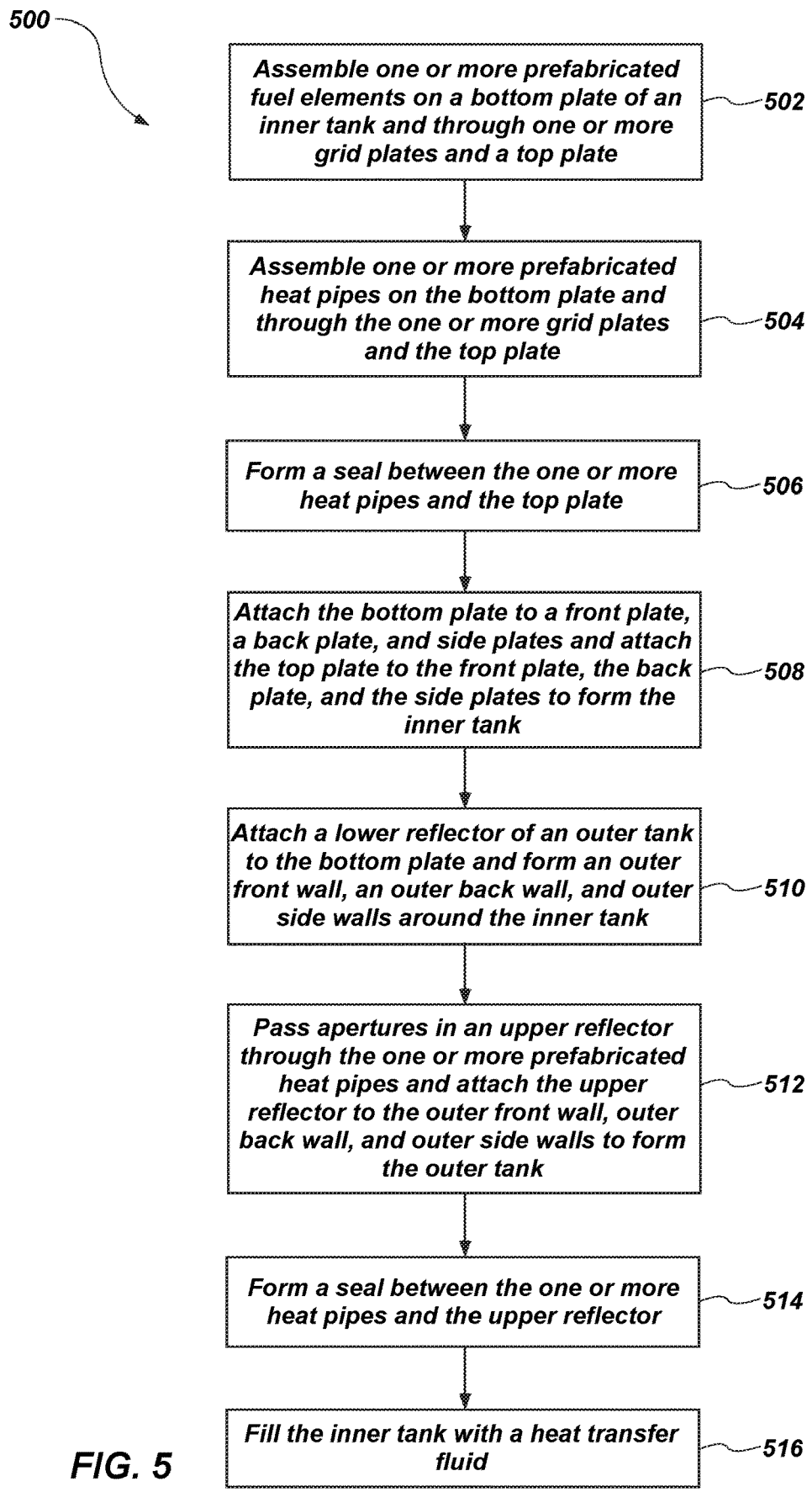
FIG. 5 is a simplified flowchart illustrating a method of forming the reactor core, according to embodiments of the disclosure.

FIG. 5 is a simplified flowchart illustrating a method 500 of forming the reactor core 400 (FIG. 4A), according to embodiments of the disclosure. The method 500 comprises act 502 including assembling one or more prefabricated fuel elements on a bottom plate of an inner tank and through one or more grid plates and a top plate; act 504 including assembling one or more prefabricated heat pipes on the bottom plate and through the one or more grid plates and the top plate; act 506 including forming a seal between the one or more heat pipes and the top plate; act 508 including attaching the bottom plate to a front plate, a back plate, and side plates and attaching the top plate to the front plate, the back plate, and the side plates to form the inner tank; act 510 including attaching a lower reflector of an outer tank to the bottom plate and forming an outer front wall, an outer back wall, and outer side walls around the inner tank; act 512 including passing apertures in an upper reflector through the one or more prefabricated heat pipes and attaching the upper reflector to the outer front wall, the outer back wall, and the outer side walls to form the outer tank; act 514 including forming a seal between the one or more heat pipes and the upper reflector; and act 516 including filling the inner tank with a heat transfer fluid.

Act 502 includes assembling one or more prefabricated fuel elements on a bottom plate of an inner tank and through one or more grid plates and a top plate. The prefabricated fuel elements may be substantially the same as the fuel element 404 described above with reference to FIG. 4A through FIG. 4D. In some embodiments, it is contemplated that the one or more grid plates may be temporarily attached (e.g., tack welded) to one or more of a front plate (e.g., front plate 418 (FIG. 4C)), a back plate (e.g., back plate 420 (FIG. 4C)), or a side plate (e.g., side plates 422 (FIG. 4C)) prior to assembling the one or more fuel elements through the top plate and the one or more grid plates. The bottom plate may be configured to receive a lower portion of each of the fuel elements. The bottom plate may be configured such that a lower portion of each fuel element is coplanar with the lower portion of the other fuel elements.

Act 504 includes assembling one or more prefabricated heat pipes on the bottom plate and through the one or more grid plates and the top plate. The heat pipes may be substantially the same as the heat pipes 408 described above with reference to FIG. 4A through FIG. 4D. The bottom plate may be configured to receive a lower portion of each of the heat pipes. For example, the bottom plate may be configured such that a lower portion of each heat pipe is coplanar with a lower portion of the other heat pipes. In some embodiments, the lower portion of the heat pipes may be coplanar with the lower portion of the fuel elements.

Act 506 includes forming a seal between the one or more heat pipes and the top plate. The one or more heat pipes may be sealed to the top plate at, for example, a location proximate a top surface of the top plate. The one or more heat pipes may be welded to the top plate to form the seal between each heat pipe and the top plate. In some embodiments, the one or more heat pipes may comprise a same material as the top plate. In some embodiments, each heat pipe may be welded to the top plate prior to passing another heat pipe through the top plate, the grid plates, and to the bottom plate.

Act 508 includes attaching the bottom plate to a front plate, a back plate, and side plates and attaching the top plate to the front plate, the back plate, and the side plates to form an inner tank. The front plate, the back plate, and the side plates may be substantially similar to the front plate 418, the back plate 420, and the side plates 422 described above with reference to FIG. 4C. In some embodiments, the plates are attached to each other by welding.

Act 510 includes attaching a lower reflector of an outer tank to the bottom plate and forming an outer front wall, an outer back wall, and outer side walls around the inner tank. Attaching the lower reflector to the bottom plate may comprise welding the lower reflector to the bottom plate. The front wall, the back wall, and the side walls of the outer tank may be welded to a respective front wall, back wall, and side walls of the inner tank. In addition, one or more of the front wall, back wall, and side walls of the outer tank may be welded to the lower reflector. In some embodiments, each of the walls may comprise the same material (e.g., 316 stainless steel).

Act 512 includes passing apertures in an upper reflector through the one or more prefabricated heat pipes and attaching the upper reflector to the outer front wall and outer back wall, and the outer side walls to form the outer tank. The upper reflector may be welded to the outer front wall, the outer back wall, and the outer side walls. In some embodiments, a volume between the top plate and the upper reflector may be filled with a liquid, such as, for example, sodium, or a gas, such as, for example, argon.

Act 514 includes forming a seal between the one or more heat pipes and the upper reflector. The one or more heat pipes may be sealed to the upper reflector at, for example, a location proximate a top of the upper reflector. The one or more heat pipes may be welded to the upper reflector to form the seal between each heat pipe and the upper reflector. In some embodiments, the one or more heat pipes may comprise a same material as the upper reflector.

Act 516 includes filling the inner tank with a heat transfer fluid. The inner tank may be filled from a fill tube (e.g., fill tube 424 (FIG. 4C, FIG. 4D)) extending through the upper reflector and the top plate into the inner tank. After filling the inner tank with the heat transfer fluid, the fill tube may be plugged or otherwise sealed.

Figure 6:
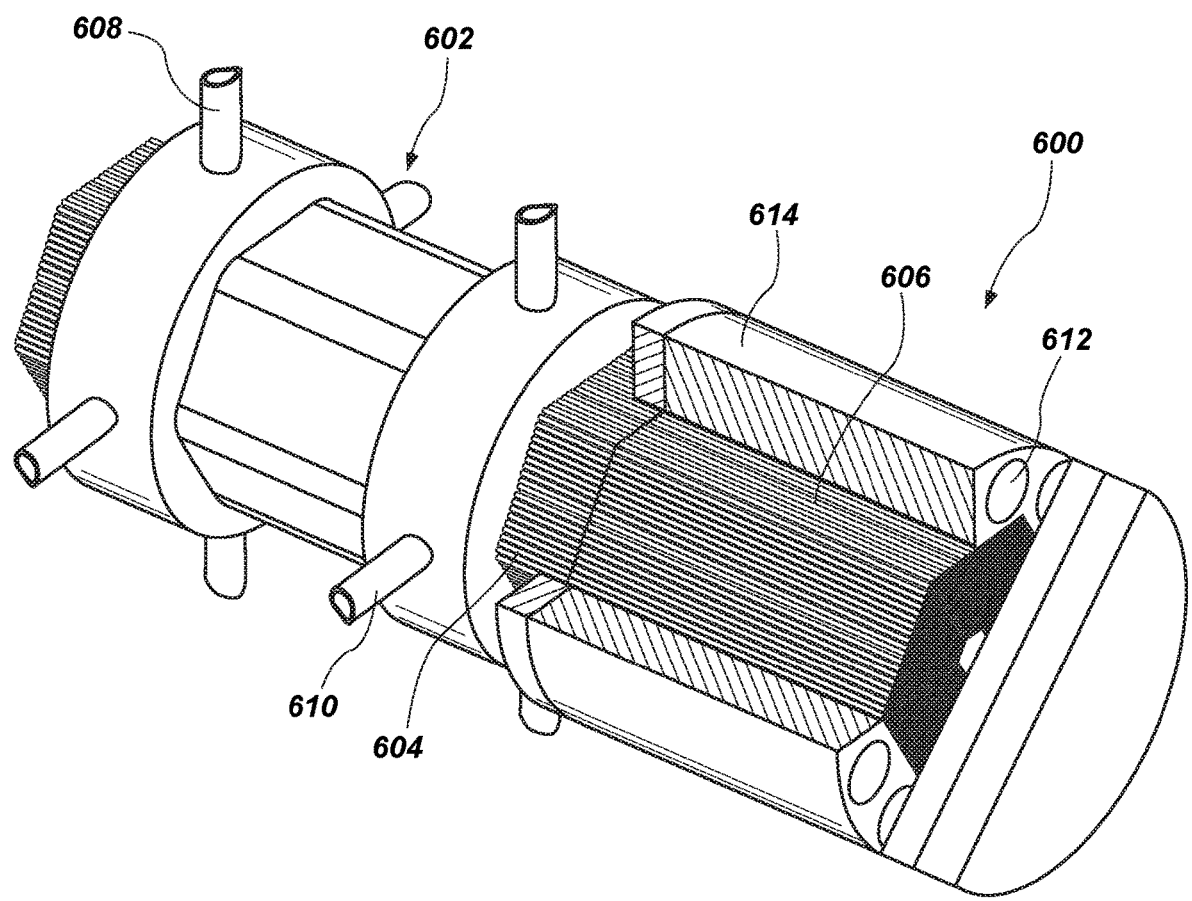
FIG. 6 is a simplified cut-away perspective view of a reactor core operably coupled to a heat exchanger, according to embodiments of the disclosure.

FIG. 6 is a simplified cut-away perspective view of a reactor core 600 operably coupled to a heat exchanger 602. The reactor core 600 may be substantially similar to the reactor core 200 or the reactor core 400 described above with reference to FIG. 2A and FIG. 4A, respectively. In some embodiments, the reactor core 600 may have a diameter of about 1 meter and a length of about 1.5 meters.

The reactor core 600 may include a plurality of heat pipes 604 extending therethrough. The heat pipes 604 may extend from the reactor core 600 to the heat exchanger 602. A material within the heat pipes 604 may be heated in the reactor core 600 by fuel elements 606 in the reactor core 600.

The heated material in the heat pipes 604 may be cooled in the heat exchanger 602. The heat exchanger 602 may comprise inlet connections 608 for operably coupling the heat exchanger 602 to a heat transfer fluid and outlet connections 610 for discharging a heated heat transfer fluid from the heat exchanger 602. The heat transfer fluid may be heated by the heat pipes 604 in the heat exchanger 602. The heated heat transfer fluid may be used to produce power, as will be understood by those of ordinary skill in the art.

The reactor core 600 may be surrounded by a plurality of rotating control drums 612 configured to control a reaction rate of the reactor core 600. A side reflector 614 may surround the reactor core 600. The side reflector 614 may comprise any neutron reflector material such as, for example, beryllium oxide (BeO), stainless steel (e.g., 316 stainless steel), or alumina ($Al_2O_3$). The plurality of rotating control drums 612 may be disposed within the side reflector 614.

Figure 7:
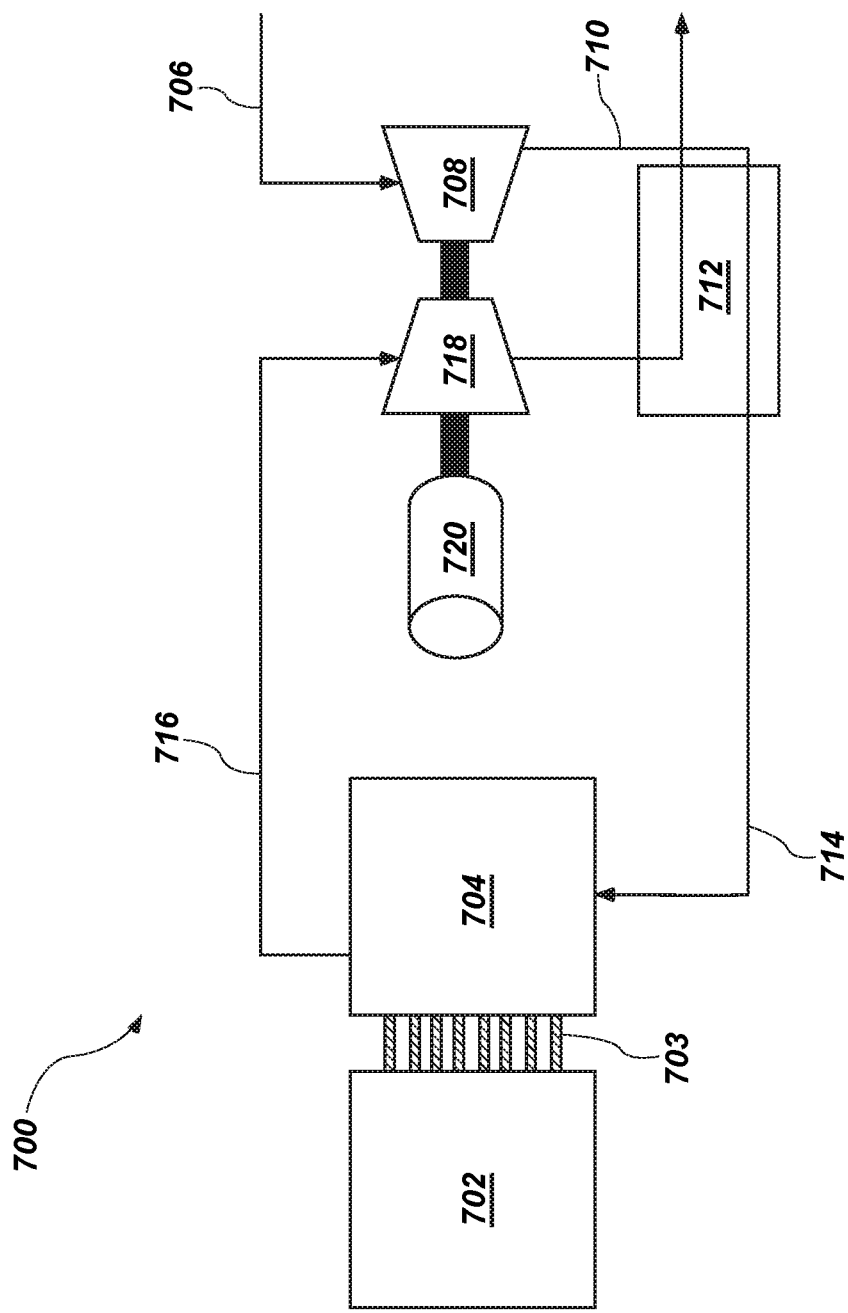
FIG. 7 is a simplified schematic illustrating a system for power generation, according to embodiments of the disclosure.

FIG. 7 is a simplified schematic illustrating a system 700 for power generation, according to some embodiments of the disclosure. The system 700 may include a nuclear reactor core 702 configured to generate heat. The reactor core 702 may comprise a plurality of heat pipes 703 configured to transfer heat from fuel elements of the reactor core 702 to a fluid outside of the reactor core 702. The reactor core 702 may be coupled to a heat exchanger 704 through the heat pipes 703, which may extend from the reactor core 702 to the heat exchanger 704. The reactor core 702 and the heat exchanger 704 may be substantially similar to the reactor core 600 and the heat exchanger 602 described with reference to FIG. 6.

A fluid 706 may be compressed in a compressor 708 to form a compressed fluid 710. The compressed fluid 710 may pass through a recuperator 712 wherein the compressed fluid 710 is partially preheated to form a preheated fluid 714. The preheated fluid 714 may be passed across the heat pipes 703 extending into the heat exchanger 704 to heat the preheated fluid 714 and form a heated fluid 716. Energy from the heated fluid 716 may be recovered in a turbine 718, which may be coupled to a power generator 720 to produce power. In some embodiments, the power generator 720 may be operably coupled to the compressor 708 to drive the compressor 708.

In some embodiments, the fluid 706 may comprise air. In other embodiments, the fluid 706 may comprise carbon dioxide, nitrogen, or other fluid through which heat may be exchanged.

Although FIG. 7 illustrates that the system 700 as comprising an open cycle, the disclosure is not so limited and the system 700 may comprise any system for heat recovery, such as, for example, a Brayton cycle system. One of ordinary skill in the art will understand that the reactor core 702 may be used in any type of system for power generation.

In some embodiments, the reactor core 702 may be configured to provide between about 2 MW and about 8 MW of power, such as between about 2 MW and about 4 MW, between about 4 MW and about 6 MW, or between about 6 MW and about 8 MW of power. In some embodiments, the reactor core 702 is configured to provide about 5 MW of power.

While embodiments of the disclosure may be susceptible to various modifications and alternative forms, specific embodiments have been shown by way of example in the drawings and have been described in detail herein. However, it should be understood that the disclosure is not limited to the particular forms disclosed. Rather, the disclosure encompasses all modifications, variations, combinations, and alternatives falling within the scope of the disclosure as defined by the following appended claims and their legal equivalents.

What is claimed is:
1. A modular nuclear reactor, comprising:
a plurality of sections, each section comprising:

a tank comprising a front plate, a back plate, side plates, a top plate, and a bottom plate;

a plurality of grid plates within the tank, each grid plate of the plurality of grid plates comprising a plurality of apertures and vertically separated from an adjacent grid plate;

a plurality of fuel elements extending through each grid plate of the plurality of grid plates; and a plurality of heat pipes extending through each grid plate of the plurality of grid plates, the top plate, and an upper reflector; and a side reflector material surrounding the plurality of sections.

2. The modular nuclear reactor of claim 1, wherein the tank is filled with a heat transfer fluid, the heat transfer fluid in contact with the plurality of fuel elements, the plurality of heat pipes, and the plurality of grid plates.

3. The modular nuclear reactor of claim 2, wherein the heat transfer fluid comprises sodium.

4. The modular nuclear reactor of claim 1, wherein each heat pipe of the plurality of heat pipes comprises potassium, sodium, or a combination thereof.

5. The modular nuclear reactor of claim 1, wherein the tank is an inner tank, the inner tank surrounded by an outer tank, the outer tank comprising the upper reflector and a lower reflector.

6. The modular nuclear reactor of claim 1, wherein each grid plate of the plurality of grid plates comprises stainless steel.

7. The modular nuclear reactor of claim 6, wherein the each heat pipe of the plurality of heat pipes comprises 316 stainless steel.

8. The modular nuclear reactor of claim 1, wherein the tank comprises stainless steel.

9. The modular nuclear reactor of claim 1, wherein each heat pipe of the plurality of heat pipes is welded to the top plate and the upper reflector.

10. The modular nuclear reactor of claim 1, wherein each section comprises about between 100 heat pipes and 300 heat pipes.

11. The modular nuclear reactor of claim 1, wherein the plurality of sections comprises six sections, the six sections arranged in a circular pattern, a central opening shaped and configured to receive a control rod.

12. A method of forming a modular nuclear reactor, the method comprising:

assembling a plurality of prefabricated fuel elements on a bottom plate of an inner tank and through apertures in a plurality of grid plates, the plurality of grid plates vertically separated from an adjacent grid plate;

assembling a plurality of prefabricated heat pipes on the bottom plate of the inner tank, through the apertures in the plurality of grid plates, and through an upper reflector;

forming a seal between the one or more prefabricated heat pipes and a top plate of the inner tank;

coupling each of the top plate and the bottom plate to side plates, a front plate, and a back plate, the grid plates located within the inner tank;

forming an outer tank substantially surrounding the inner tank;

filling the inner tank with a heat transfer fluid; and placing a side reflector material proximate the outer tank.

13. The method of claim 12, further comprising selecting the heat transfer fluid to comprise sodium.

14. The method of claim 12, further comprising selecting the bottom plate and the plurality of grid plates to comprise 316 stainless steel.

15. The method of claim 12, further comprising selecting the one or more prefabricated heat pipes to comprise sodium, potassium, or a combination thereof.

16. The method of claim 12, wherein forming an outer tank substantially surrounding the inner tank comprises welding the plurality of prefabricated heat pipes to the upper reflector.

* * * * *

UNITED STATES PATENT AND TRADEMARK OFFICE
CERTIFICATE OF CORRECTION

PATENT NO. : 10,559,389 B2
APPLICATION NO. : 15/425414
DATED : February 11, 2020
INVENTOR(S) : James Sterbentz and James E. Werner Page 1 of 1

It is certified that error appears in the above-identified patent and that said Letters Patent is hereby corrected as shown below:

In the Specification
Column 1, Line 53, change "and heat, pipes 106" to
--and heat pipes 106--

Signed and Sealed this
Seventeenth Day of March, 2020

Andrei Iancu
*Director of the United States Patent and Trademark Office*